United States Patent [19]

Biles

[11] Patent Number: 5,369,763

[45] Date of Patent: Nov. 29, 1994

[54] DATA STORAGE AND RETRIEVAL SYSTEM WITH IMPROVED DATA BASE STRUCTURE

[75] Inventor: Bertram R. Biles, Manhattan, Kans.

[73] Assignee: Kansas State University Research Foundation, Manhattan, Kans.

[21] Appl. No.: 888,331

[22] Filed: May 26, 1992

Related U.S. Application Data

[63] Continuation-in-part of Ser. No. 888,401, May 21, 1992, abandoned, which is a continuation of Ser. No. 304,685, Feb. 1, 1989, abandoned.

[51] Int. Cl.⁵ .................... G06F 7/06; G06F 15/40
[52] U.S. Cl. .................... 395/600; 364/963.1; 364/970.5; 364/974.3; 364/974.5; 364/DIG. 1
[58] Field of Search .............. 395/600, 650, 700

[56] References Cited

U.S. PATENT DOCUMENTS

| | | | |
|---|---|---|---|
| 4,085,466 | 4/1978 | Nagamura | 364/900 |
| 4,694,396 | 9/1987 | Weisshaar et al. | 364/200 |
| 4,920,499 | 4/1990 | Skeirik | 364/200 |
| 4,945,475 | 7/1990 | Bruffey et al. | 395/600 |

*Primary Examiner*—Gareth D. Shaw
*Assistant Examiner*—John Q. Chavis
*Attorney, Agent, or Firm*—Hovey, Williams, Timmons & Collins

[57] ABSTRACT

A data storage and retrieval system separates information regarding the expertise of individuals into four files which can be independently and separately accessed. The records in the various files include fields for indicating the beginning and end of a range of topics within a hierarchical classification system, the level of the topic within the classification system and a field for facilitating alphabetic sorting of topics independently of hierarchical level, and a novel code format for the beginning and end of range indicators permits a small computer to effectively manipulate data in a hierarchical classification system.

15 Claims, 22 Drawing Sheets

Microfiche Appendix Included
(4 Microfiche, 255 Pages)

| ID Number | Location | Category |
|---|---|---|
| AAA000.0000 | . | AA - Copyright (c) 1987, KSU Research Foundation |
| 0 | . | TECHNOLOGY. (General) |
| 10.5 | 2 | Technical information, communication of |
| 54 | 1 | Industrial safety |
| 55.4 | 4 | Industrial engineering. Management engineering |
| 57 | 5 | Applied mathematics. Quantitative methods |
| 57.6 | 6 | Operations research. Systems analysis |
| 57.62 | 12 | Simulation |
| 57.7 | 2 | Production capacity. Manufacturing capacity |
| 58.4 | 4 | Managerial control systems |
| 58.6 | 5 | Management information systems |
| 59 | 3 | Standardization |
| 59.7 | 6 | Human engineering in industry |
| 60 | 5 | Work measurement. Methods engineering |
| 61 | 12 | Technical education |
| 173.2 | 3 | Technological change |
| 175 | 2 | Industrial research. Research and development |
| 201 |  | Patents. Trademarks |

Command list 1: Autohelp Browse Create Delete Enter Find Goto Help
               Print Query Report Scroll Update
File: Typ-T-5  Window: 1
Browse - displays records in a tabular format

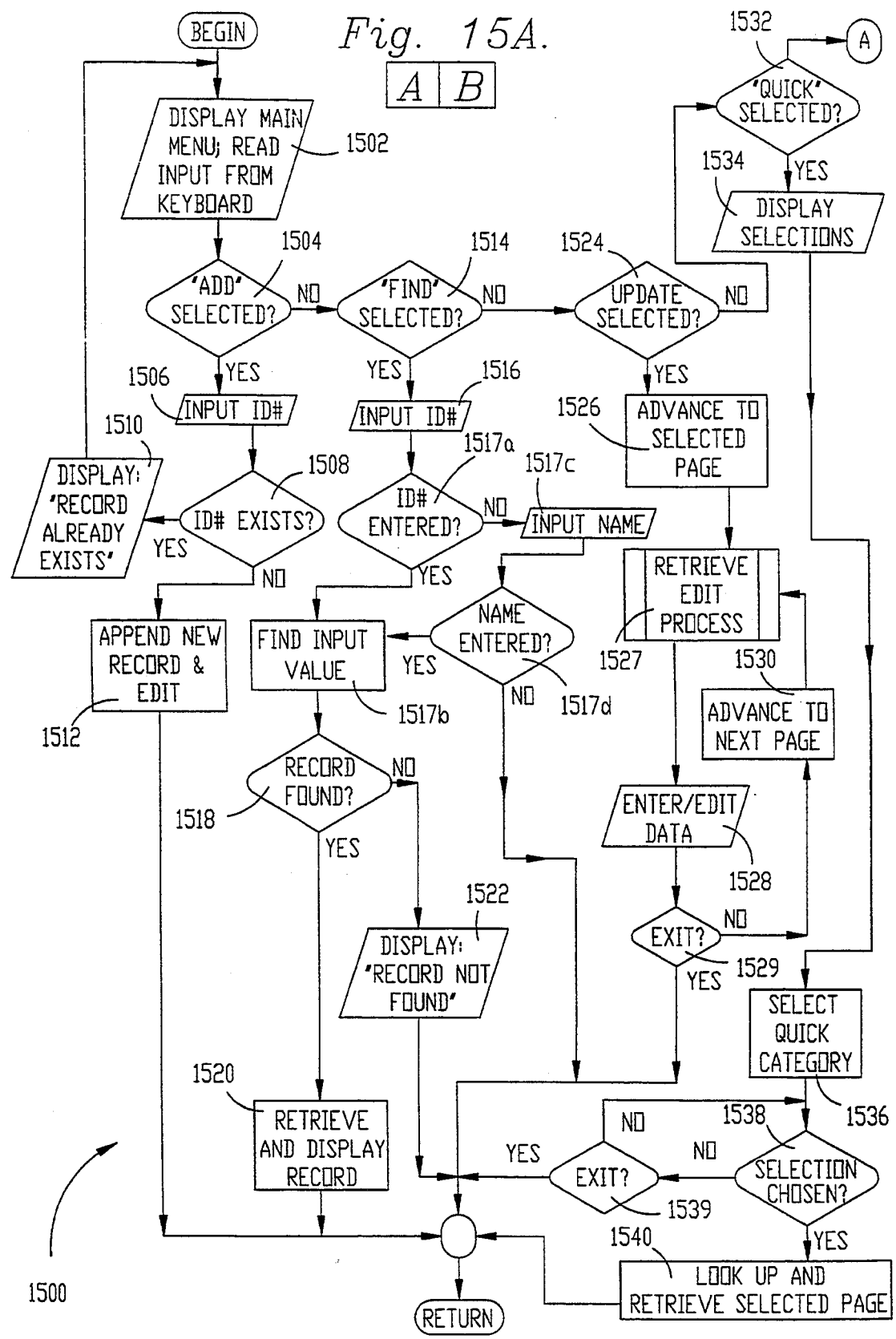

| A | B | C | D |

DATA STORAGE AND RETRIEVAL SYSTEM WITH IMPROVED DATA BASE STRUCTURE

Continuation-in-part of Ser. No. 07/888,401 filed May 21, 1992, now abandoned which was a continuation of Ser. No. 07/304,685, filed Feb. 1, 1984, now abandoned. A microfiche appendix containing the source code of a computer program useful in accordance with the present invention is appended hereto four sheets of microfiche containing 255 frames.

BACKGROUND OF THE INVENTION

The present invention relates generally to collecting, cataloging, storing, searching, locating, querying, retrieving, and displaying information regarding all aspects of human thought and endeavor; and more specifically to classifying and retrieving information concerning the interests, skills, abilities, experiences, resources, preferences, education, training and/or other characteristics of individuals, employing a universal and comprehensive classification scheme, in an integrated system supporting multiple data base locations and multiple access points, implemented with personal computer hardware and commercially available data base application programs.

The present invention represents a novel strategy for the application of a unique classification scheme and all innovative retrieval strategy to a personal computer-based data system. As background for understanding the present invention, brief introductory comments follow regarding data systems, classification systems, retrieval systems, and the Library of Congress Classification System.

Data systems

The first aspect of the present invention to be introduced is the means of collecting and storing the basic information about the individuals in question. Recently-published printed catalogs of information about the research interests and accomplishments of university faculty members are fixed, unchanging documents, ordered as the editor chose (which may or may not meet the needs of the user), and are usually single-topic in nature.

Storage of information by writing it on pieces of paper has been augmented by the use of newer storage media, including punched card, photography (including such forms as microfiche), electronic recording (e.g., magnetic tape), holography, optical disk, computer disk, and a variety of other more or less exotic media.

The present invention is based on current personal computer technology, employing floppy disks, fixed disks, CD ROM, streaming magnetic tape cartridge or other magnetic or optical storage media.

Classification Systems

A scheme for classifying the information is absolutely necessary for effectively using data that has been gathered and stored. But classification is more than the naming of things, it is also the arrangement of things in some sort of logical order so that the relationships of the things may be ascertained.

The organization of the holdings of the Library of Congress is a classic example of the development and application of a subject classification scheme designed to meet a specific need. It also serves to illustrate the size and complexity of the task: more than 700 individuals are currently employed by the Library of Congress in support of the cataloging and classification function.

Attempts by others to develop classification schemes to be applied to human thought and endeavor have been less than successful, because of the complexity of the task, the need for a comprehensive scheme, and the difficulties posed by the requirements to regularly update the system.

Idiosyncratic classification schemes that are not based on conventional and historical notions about the organization of knowledge seem strange and unusual to those familiar with common practices.

Classification schemes that are significantly less than comprehensive in scope invite ad hoc elaboration, which eliminates their usefulness across a wide spectrum of users.

Likewise, the inability of most developers to provide systematic maintenance and updating of their classification schemes as scientific and social thought advances and changes greatly diminishes the usefulness of most systems.

The present invention represents a novel adaptation and modification of the current Library of Congress Classification System for the task of classifying and retrieving information concerning the interests, skills, abilities, experiences, resources, preferences, education, training and/or other characteristics of individuals.

Retrieval Systems

Being able to classify information is only half of the task; it must also be possible to retrieve the correct information from among the mass of collected data. Equally important in using data that has been gathered, stored, and classified is the means employed to sort through the data and retrieve the relevant information.

One form of retrieval system relates to locating and retrieving books in a library. With the advent of computers, the development of on-line automated catalogs for bibliographic retrieval became a reality. Another form of data retrieval involves searching data bases based on specific query criteria, and such data storage and retrieval systems of great complexity and sophistication are possible on mainframe computers. Typically, a skilled programmer (or team of programmers) will write a specific data base program to accomplish a particular task. Often, this is a lengthy process involving several person-years of effort, with subsequent change an equally laborious task. The data and the program are typically maintained on a single computer, which creates certain access and security issues.

With the advent of the personal computer, three developments occurred. First, data base application programs were created, which made it possible for any computer-literate person to create and use his own data base. Second, the data base application programs made it very easy to modify, change, and adapt the form and structure of existing data bases. And third, by creating individual data bases, data control and security was moved much closer to the creator/user/data source.

The efficacy of a particular data base application program is directly related to the power, sophistication, and ease-of-use of the query or search routines incorporated into the program. The ability of the data base application program to employ Boolean algebraic search routines, combined with the capacity to handle searches expressed as complex, large formulas is critical to the usefulness of the program.

A significant dimension of a retrieval system is its ability to define and accommodate hierarchical searching procedures. This critical and useful dimension, usually missing from most systems because of complexity in implementation, must be incorporated at the time the storage and retrieval components are constructed.

While single-site data bases require no special characteristics, data base systems intended for multiple-site configuration pose special problems if the data control and security benefits inherent in single-site data bases are not to be compromised in an effort to catalog individuals at multiple sites and/or to provide multiple-site access to the data base.

The Library of Congress Classification System

Since the present invention is based, in part, on the Library of Congress Classification System, which is in the public domain, a brief introduction to the Library of Congress System follows.

Subject classification schemes for libraries are borrowed from the logical or philosophical principles of classification. Classification begins with the universe of knowledge as a whole and divides it into successive stages of classes and subclasses, with a certain characteristic as the basis for each stage. Progression is from the general to the specific, forming a hierarchical structure, or an "inverted tree". Each class is a species of the one in the preceding stage, and each class is a genus to the stage below it. The elements within each stage form a coordinate relationship to one another. They are usually mutually exclusive categories, and are collated according to the affinity of their relationships.

The Library of Congress Classification System originated in the latter part of the Nineteenth Century, and adheres generally to these taxonomic and hierarchical principles. The characteristics of, or basis for, division vary from subject to subject, with each characteristic being called a facet. For example, architecture can be classified according to schools and styles, according to periods, or according to types of buildings.

The coordinate elements on each level or stage of division form an array. For example, the elements "American literature", "English literature", "German literature", etc., are all on the same level, e.g., one level below the facet entitled "Literature".

A string of subjects, each of which represents a different (lower) level in the classification, is called a string. For example, each of these elements fall below the preceding element:

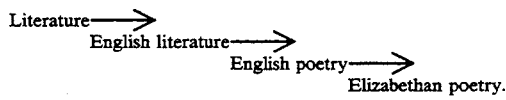

There is not always a built-in or natural order of the characteristics or facets in each class. In order to maintain consistency, each classification system will determine the order of the facets to be used, called citation order.

Traditional library classification schemes tend to enumerate all subjects and their subdivisions and provide ready-made symbols for them. This is referred to as an enumerative classification. Among the existing library classification schemes, the Library of Congress Classification System is considered to be the most enumerative.

Each classification scheme adopts a system of symbols as class marks which represent the classes and divisions. The purpose of using such a device, called notation, is to designate briefly the subjects and sometimes their relationships as well, and to provide a sequential order for a logical arrangement. A notation system using both letters and numerals, such as the Library of Congress Classification System, is called a mixed notation system.

The current Library of Congress Classification System consists of 21 classes, displayed in more than 30 separately-published Schedules. The Schedules each contain an entire class, a subclass, or a group of subclasses, each of which has been developed and published separately. Thus, the Library of Congress Classification System may be thought of as a "coordinated series of special classifications".

The Library of Congress Classification System is basically classification by discipline. The entire field of knowledge is divided into main classes corresponding to major academic disciplines. Because of the use of letters as notation for representing main classes, there is a larger number of main classes in the Library of Congress Classification System than in other systems e.g., the Dewey Decimal Classification System, which nominally has ten.

The main classes in the Library of Congress Classification System are divided into subclasses, which are further subdivided into form, place, time, and subject or topical aspects. The Library of Congress Classification System thus forms a hierarchical structure, progressing from the general to the specific. However, except in the *Library of Congress Classification Outline*, a notational form that explicitly denotes the hierarchical structure is not employed.

It should be borne in mind that the Library of Congress Classification System was not designed as a general, universal system, but rather as a system specifically tailored to the needs of the Library of Congress collection.

The Library of Congress Classification System, both in its original form and with later changes, expansions, and revisions, is based on the "literary warrant" of the Library of Congress collection. "Literary warrant" is a term used to refer to the actual holdings of the Library of Congress. The details of the Library of Congress Classification System always have been developed according to the needs of the Library's collection, as opposed to a theoretical construct of the scope of human knowledge.

The rationale of the arrangement of the main classes in the Library of Congress Classification System is as follows:

Class A— General Works not limited to any particular subject.

Class B— Philosophy, Religion and Psychology— sets forth the theories of man concerning the universe.

Classes C through G— History and Geography— concertos such ideas as man's abode and the source of his means of subsistence, man as affected by and affecting his physical milieu, and the mind and soul of man in transition from primitive to advanced culture.

Classes H through L— Social Sciences, Political Science, Law, and Education— bring out the economic and social evolution of man.

Classes M through P— Music, Fine Arts, Linguistics and Classical Languages, Ancient and Modern Literature, Modern Languages— concern the aesthetic and intellectual development and state of man.

Classes Q through V— Science, Medicine, Agriculture, Technology, Military and Naval Science— embraces the mathematical, physical, natural, and applied sciences.

Class Z— Bibliography and Library Science— brings together all bibliography, combined with library science.

The Library of Congress Classification System has certain characteristics that make it a particularly suitable foundation for the present invention.

In the first place, the Library of Congress Classification System is universal in its scope, i.e., it is a scheme that can be used to classify anything. Second, it is comprehensive in the range of topics coverage. Because the Library of Congress Classification System is based on the "literary warrant" of the Library of Congress, its scope covers all aspects of human thought and endeavor. Currently, Library of Congress personnel estimate that the number of topics included exceeds 600,000.

The third notable characteristic is that the expansion of the Library of Congress Classification System closely follows current scientific and cultural developments, because these developments are promulgated through publication, which must be cataloged for inclusion in the Library holdings. A corollary is that the Library of Congress Classification System remains current for the same reason: to serve Congress, the Library must keep its acquisitions up-to-date, thus forcing the classification and cataloging processes to keep pace.

A further important characteristic of the Library of Congress Classification System is that it is used almost universally in academic and research libraries in the United States. This makes it the only subject classification system widely known to all academics and researchers, and for which there are "experts" in the presence of academic librarians on every university campus across the United States.

SUMMARY OF THE INVENTION

In view of the above, it is a primary object of the pre-sent invention to provide a data storage and retrieval system that facilitates collecting, cataloging, storing, searching, locating, querying, retrieving, and displaying information regarding all aspects of human thought and endeavor, including but not limited to information concerning people, places, things, ideas, and/or events.

It is a further object of the invention to provide a means for classifying and retrieving information concerning the interests, skills, abilities, experiences, resources, preferences, education, training, and/or other characteristics of individuals.

It is a further object of the invention to protect the privacy of the individuals represented in the data base.

It is a further object of the present invention to provide for the recording of data about individuals on several different topics in the same data base system.

It is a still further object of the invention to provide for easy, fast, and accurate data entry.

It is a further object of the invention to provide a universal and comprehensive classification scheme that can be used to catalog any and all information regarding all aspects of human thought and endeavor.

It is a still further object of the invention to provide a universal and comprehensive classification scheme for cataloging the data that is hierarchical ill design and self-indexing.

It is a further object of the invention to provide an integrated system supporting multiple data base locations and multiple access points not necessarily at the same sites.

It is yet a further object of the invention to provide for powerful query and search capabilities.

It is a further object of the invention to provide for the specification of detail in queries and searches.

It is a further object of the invention to provide for easy updating of the "catalog" component.

It is yet a further object of the invention to implement the data storage and retrieval system with personal computer hardware and commercially available data base application programs.

Briefly, these and other objects of the invention are achieved, in accordance with the broadest aspect of the present invention, by a Data Storage and Retrieval System comprising: (1) a Subject Data Base containing records which contain information about individuals who are the focus of the system; (2) a Typology Data Base containing information regarding the elements upon which the classification system is based; (3) an Identifier Data Base containing descriptive information which facilitates access to the information contained in the Subject Data Base and, if appropriate, indicates the nature of that information; and (4) a Composite Catalog Data Base which is a self-indexing catalog that identifies the topics for which Subject Data Base records exist, incorporates a link to the Identifier Data Base, and conveys, in at least outline form, the basic nature of the classification system contained in the Typology Data Base.

In the preferred embodiment, the characteristics that are to be categorized regarding the individuals included in the Subject Data Base are described in listings under categories defined by the constructor. These listings are based on the elements of the classification scheme, which are contained in the Typology Data Base. The Subject Data Base may provide for classification under as many categories as is appropriate, and may provide for as many topics under each category as is necessary, taking into account any limitations imposed by the data base application program.

In the preferred embodiment, the classification system used in the present invention is an adaptation of and an improvement upon the Library of Congress Classification System. Basing the classification scheme upon the Library of Congress Classification System results in the creation of a classification system that is universal in its application potential and comprehensive in its coverage of all aspects of human thought and endeavor.

The inclusion of a Typology Number in the classification system facilitates the accurate numeric sorting of the typology elements on the basis of their numeric positions within the classification system. Preferably, the Typology Numbers are obtained through modifications to the alphanumeric form of the Library of Congress numbers which permit the modified alphanumeric numbers to be directly operated on by the query and sort routines incorporated into commercially available data base application programs.

The use of a Typology Number and an End-of-Range Number in the system of the present invention allows precise definition and presentation of the hierarchical level and range that a particular topic represents— an aspect of the classification scheme that is otherwise not immediately and readily discernible to the user.

The inclusion of both the Typology Number and an End-of-Range Number in the classification system facilitates the construction of query and sort routines used in selecting appropriate records from the Subject Data Base.

The inclusion of an Alpha Sort field in the storage and retrieval system facilitates the accurate alphabetic sorting of the Typology elements on the basis of the content of the Descriptor Phrase field. (Actually using the query and sort routines incorporated into commercially available data base application programs to sort the elements on the contents of the Descriptor Phrase field does not produce useful sorts because of how the query and sort procedures handle leading spaces and/or capitalization in alphanumeric fields.)

The inclusion of a Level Sort field in the storage and retrieval system facilitates the accurate display of the Typology elements at the various hierarchical levels incorporated into the classification system.

In the preferred embodiment, the specific listings of categorized topics describing individuals included in the Subject Data Base are incorporated into the Composite Catalog Data Base, which provides an efficient and useful vehicle for discerning which topics represent individual characteristics and for planning queries and searches. To facilitate a review of its contents, the Composite Catalog Data Base can be sorted numerically on the Typology Numbers, or alphabetically on the Alpha Sort field records, can be displayed at all hierarchical levels, and can be queried, based on various combinations of fields.

To identify location and to facilitate access to the appropriate Subject Data Base, records contained in the Identifier Data Base include the name, address, and telephone number of the appropriate, trained "gateway" or "access" persons at the various institutions supporting Subject Data Bases.

The inclusion of links to records in the Identifier Data Base within the Composite Catalog Data Base records of the present invention facilitates the inclusion in the system of Subject Data Bases at multiple sites, provides for multiple access points to the system, provides for insuring the privacy of the individuals listed in the various Subject Data Bases, and facilitates access to the various Subject Data Bases via trained "access" or "gateway" individuals at each institution supporting a Subject Data Base.

In addition to records representing characteristics of individuals included in the Subject Data Base, the Composite Catalog Data Base of the present invention includes a large number, e.g., 1,000–2,000, of records at the highest (broadest) hierarchical levels of the classification system, thus providing the user reviewing the Composite Catalog Data Base with a comprehensive, hierarchical overview of the entire classification scheme.

BRIEF DESCRIPTION OF THE DRAWINGS

Other objects and advantages of the invention will become apparent upon reading the following detailed description with reference to the accompanying drawings, in which:

FIG. 6 is a structural diagram of the alphanumeric form of the Typology Number and the End-of-Range Number;

FIG. 7 is an illustration of the Composite Catalog Data Base 4 in the Browse Mode;

FIG. 15A is a computer program flow chart illustrating the first portion of the ENTRY program module;

DESCRIPTION OF THE PREFERRED EMBODIMENT

Turning now to FIG. 1, there appears an illustration of the four data bases which constitute the Data Storage and Retrieval System. The Subject Data Base 1 consists of records which contain information about the individuals who are the focus of the system, whose interests and skills are cataloged by the system. The Typology Data Base 2 contains the records each corresponding to a respective topic in the classification scheme upon which the entire Data Storage and Retrieval System is based. The Identifier Data Base 3 contains records each corresponding to a respective category of expertise covered by the Data Storage and Retrieval System, each record containing descriptive information which facilitates access to the information contained in the Subject Data Base 1 by indicating the location of the appropriate Subject Data Base 1 (i.e., the name of the institution having persons with expertise in this category), the name of the "access" or "gateway" person, and the nature of the information concerning the subjects cataloged in the Subject Data Base 1. The final component is the Composite Catalog Data Base 4, which is a self-indexing catalog that identifies the topics for which Subject Data Base 1 records exist, incorporates a relational link to the Identifier Data Base 3, and conveys, in at least outline form, the basic nature of the classification scheme contained in the Typology Data Base 2 that undergirds the entire system.

As used herein and in the appended claims, the term "Data Base" refers to a collection of data which may be separately stored and manipulated. It should be appreciated, however, that somewhat different terminology may be arbitrarily used, e.g., the entire system of FIG. 1 may be referred to as a single Data Base with each of the components 1, 2, 3, and 4 comprising a separate file in that Data Base. The significance in referring to these components as separate "Data Bases," in the description of the preferred embodiment herein and ill those claims which recite separate Data Bases, is that the data in one component can be stored separately and manipulated separately from the data in any other component.

Description of the Subject Data Base

Figure 1A:
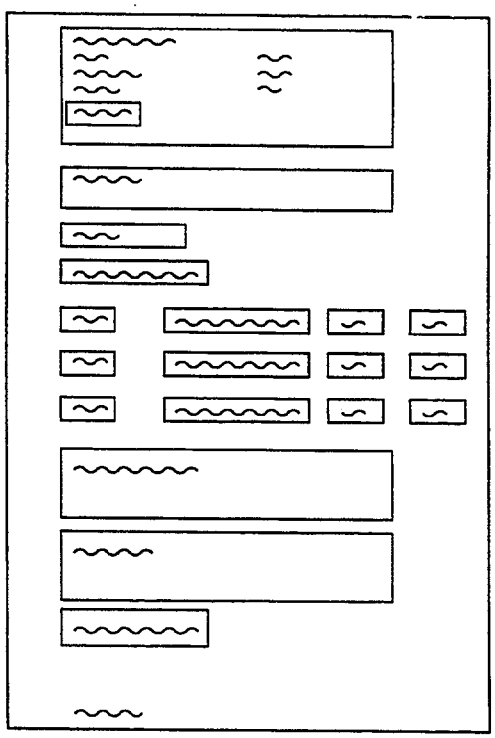
FIG. 1 is a diagram of a data storage and retrieval system incorporating a Subject Data Base 1, a Typology Data Base 2, an Identifier Data Base 3, and a Composite Catalog Data Base 4.
Figure 1B:
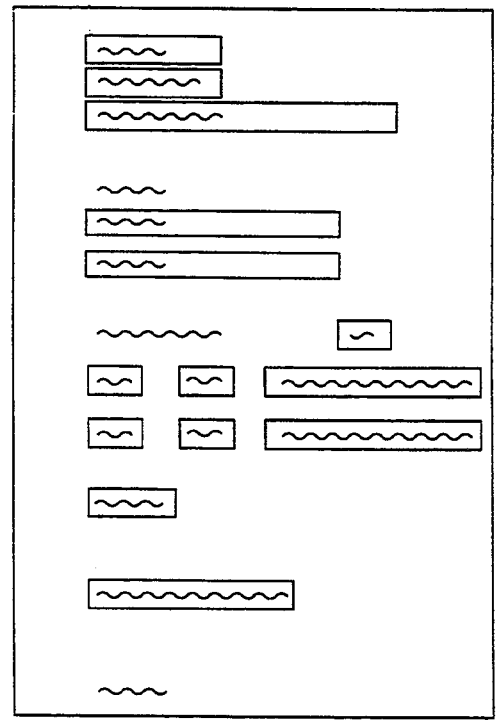
Figure 1C:
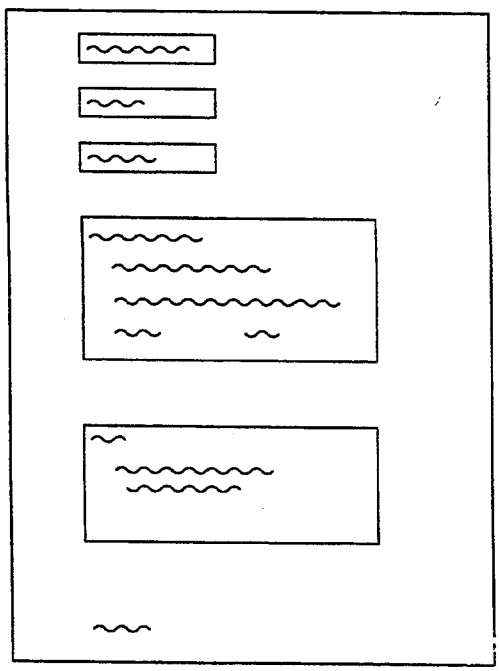
Figure 1D:
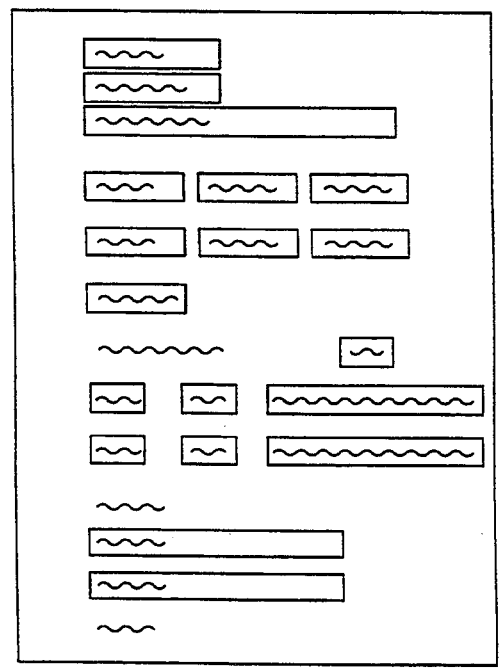
Figure 2:
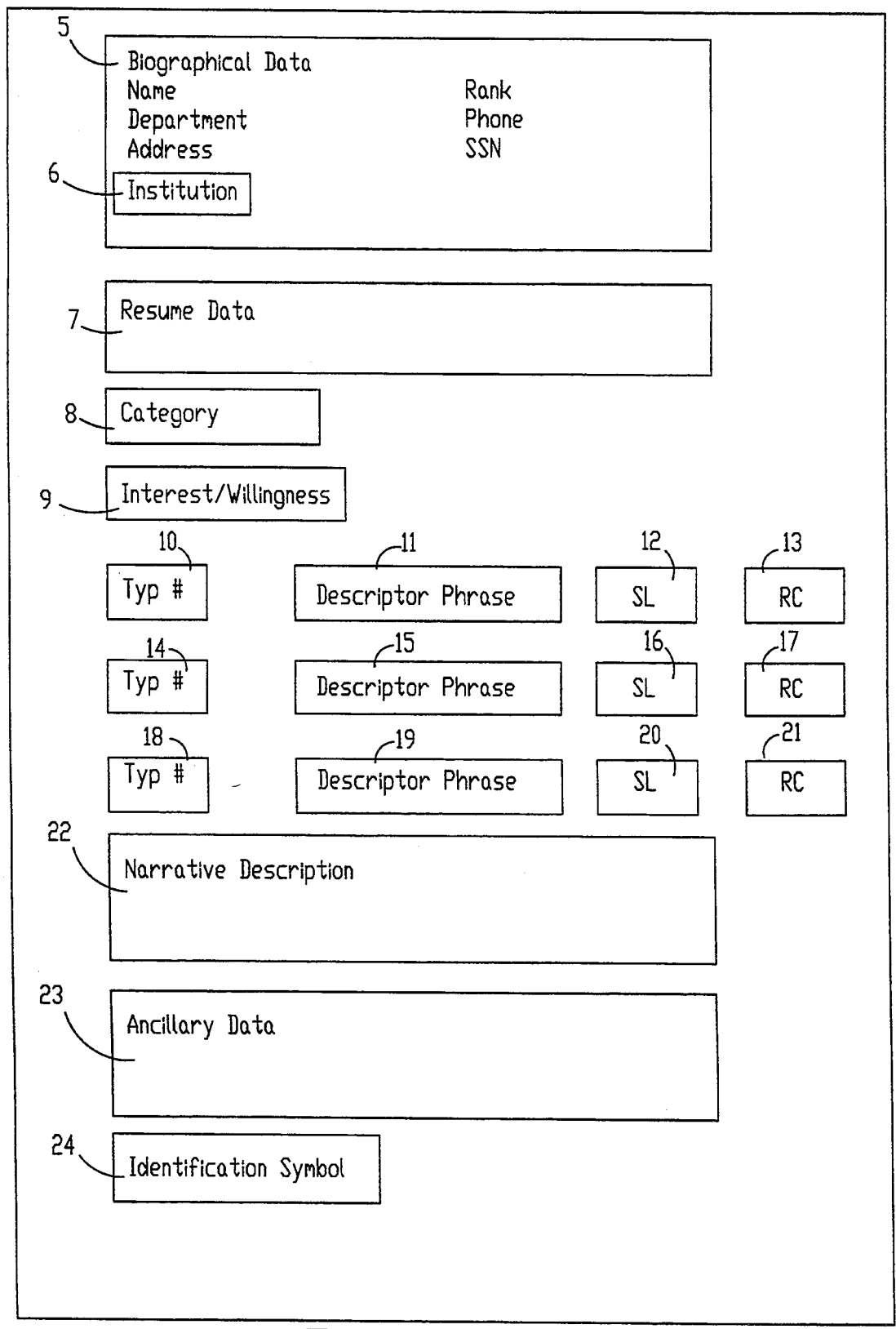
FIG. 2 is a diagram of the Subject Data Base 1, illustrating its various data elements.

As FIG. 2 illustrates, in the preferred embodiment of this invention each record in the Subject Data Base 1 contains several different types of information, grouped into at least three data sections, i.e., a Biographical data section, a Resume data section and one or more Category data sections.

Since individuals are the primary focus of the Data Storage and Retrieval System of this invention, tile first data section in each record of the Subject Data Base 1 is Biographical data section 5 which contains information necessary to identify and to communicate with the individual who is the subject of this record, e.g., name, department, position, institutional address, institutional telephone number, unique employee identification number (e.g., a Social Security Number), and any other information appropriate for inclusion. The information included in the Biographical data section 5 will, of course, be contained in separate fields.

One field that must be included in the Biographical data section 5 is the Institution field 6, which lists the institution with which the subject is associated. The Institution field 6 is required to facilitate retrieving the correct information from the Identifier Data Base 3 to insert in the Identification Symbol field 24 during the construction of the records of the Subject Data Base 1, as will be described later herein.

The second data section in each record of the Subject Data Base 1 is the Resume data section 7. This data section contains additional information concerning the subject, e.g., academic degrees held, awards and honors received, grants and contracts awarded, books and articles published, and selected references. As in Biographical data section 5, information in the Resume data section 7 will be contained in separate fields.

The third data section in each record of the Subject Data Base 1 is a Category data section, which begins with a Category field 8, which includes descriptive information regarding the individual. If this particular Category data section contains the type of information about the individual which might result in the individual being asked to perform a particular task, e.g., serve as a consultant, it is helpful to include a field 9 indicating the Interest/Willingness of the subject to perform that task.

Associated with each Category data section are several listings— each listing comprising a group of four fields, with enough listings to sufficiently describe the individual according to the category identified in the Category field 8. In its preferred embodiment, the Subject Data Base 1 may include eight or more such listings or groups of fields for each Category data section.

Each listing under a particular Category data section will include four fields. The Typology Number field 10 is preferably a 22-digit alphanumeric "number" based on the Library of Congress Classification System numbers, and identifies a topic which is relevant to the category identified in the Category data field 8 and with respect to which the subject individual has some expertise. The Typology Number 10 is the primary field upon which query and sort routines operate in conducting searches of the records in the Subject Data Base. The Descriptor field 11 is a sixty-character alphanumeric phrase which describes the topic. If the Category data section in question deals with a topic involving a skill level, experience level, knowledge level, and/or competence level, then it is appropriate to incorporate a Skill Level field 12 to provide for a self-reported, range-based number reflecting the subject's self-assessment of skill or ability.

The last field in each listing is the Record Counter 13, which serves to facilitate record creation and removal in the Subject Data Base 1 and in the Composite Catalog Data Base 4.

In FIG. 2, a first topic listed under the Category data section is represented by the first group of four items 10-13; a second topic is represented by the next four items 14-17; and the third group of four items 18-21 reflect a third topic listing under this Category data section. In a typical application, sufficient groups of listings would be provided in each record of the Subject Data Base 1 to allow eight or more topics to be cataloged under each Category data section.

To provide an opportunity for the subject to expand upon and provide further explanation of the topics listed under a particular Category data section, a Narrative section 22 is included in each record of the Subject Data Base 1 for each Category data section. In the preferred embodiment, this field may be 1,000 to 10,000 or more characters in size.

To accommodate still other types of information about the subject that must be included in the Subject Data Base 1, one or more Ancillary Data fields 23 can be included for each Category data section.

The final field under each Category data section is the Identification Symbol data element 24, which serves to reference the characteristics of the subject being classified. The Identification Symbol uniquely identifies a combination of a given category and institution. If there is only one institution maintaining a Subject Data Base, there will be one Identification Symbol for each different category. The Identification Symbol 24 is used to link the Composite Catalog Data Base 4 record with the appropriate record in the Identifier Data Base 3 for the purpose of assisting the searcher using the Composite Catalog Data Base 4 in searching the appropriate Subject Data Base 1, as will be described later herein.

While FIG. 2 shows only a single Category data section, identified by Category field 8 and including its associated fields 9-24, it should be appreciated that a Data Storage and Retrieval System can be created incorporating several Category data sections in the Subject Data Base, each with its own Category field 8 and associated fields 9-24.

For example, the Subject Data Base might include two separate Category data sections, one focussing on "Economic Development" and the other on "Small Business Development", each providing for the listing of several topics. Assuming expertise in both categories, the record of a particular individual in the Subject Data Base will include one or more topic listings detailing that person's expertise under each Category data section.

The Subject Data Base 1 may be expanded to the limits of the capacity of the data base application program to accommodate the inclusion of listings under additional Category data sections by creating additional listings or groups of fields as described above for each new Category data section.

It is also to be noted that, if two individuals have expertise in the same category, their records will each include a listing under the same Category data section identified by the same Category data field 8, and each will have the same Identification Symbol referencing that same category, unless the two individuals are at different institutions or for some other reason have different contact persons, in which case they would have different Identification Symbols. If there is more than one Category data section contained the records of the Subject Data Base 1, there will be a separate Identification Symbol 24 for each Category data section, which may or may not reference different "access" or "gateway" persons.

To maintain acceptable search and retrieval speed, it may be appropriate to subdivide the Subject Data Base 1 into a "parent" data base containing only the Biographical data 5 and the Resume data 7, which is then relationally linked with a series of "child" data bases, each containing appropriate constellations of Category data sections. It will be necessary to incorporate a link field in both the "parent" and "child" data bases containing a unique number such as a Social Security Number to use in relationally linking the various Category data section "child" data bases with the "parent" data base containing the Biographical data 5 and the Resume data 7.

As noted above, each record in the Subject Data Base 1 contains several different types of information, grouped in three data sections. The Subject Data Base 1 may be constructed as follows.

The first step in constructing the Subject Data Base 1 involves determining what information is required to adequately describe the individual for inclusion in the Biographical data section 5. At the discretion of the organization building the Data Storage and Retrieval System, any appropriate biographical data can be included in this data section of the Subject Data Base 1. As noted earlier, one field that, in the preferred embodiment of this invention, must be included in the Biographical data section 5 is the Institution field 6, which lists the institution with which the subject is associated.

The second step is to determine what should be included in the Resume data section 7, which is the second data section in each record of the Subject Data Base 1.

The third step is to determine how many different types of information describing the individuals are to be catalogued, and, thus, how many different Category data sections are to be included in the records of the Subject Data Base 1.

Although the illustration in FIG. 2 shows only one Category data section, the Subject Data Base 1 may be expanded to the limits of the capacity of the data base application program to accommodate the inclusion of listings under additional Category data sections by creating additional listings or groups of fields for each new Category data section as described earlier.

For example, a Subject Data Base 1 designed to accommodate information from university faculty members might have one Category data section identified by Category field 8-a devoted to cataloging faculty research interests, a second Category data section identified by Category field 8-b devoted to cataloging faculty skills, interests, and abilities related to economic development, and a third Category data section identified by Category field 8-c devoted to cataloging faculty resources that can be focused on small business development.

As a fourth step, in addition to determining the various categories of interests, skills, abilities, training, research interests and/or other human characteristics that are to be categorized, is the determination as to the number of topics to be listed under each Category data section. Although the illustration in FIG. 2 shows only three topics listed under the Category data section, provision typically is made for including from eight to ten or more topics under each Category data section.

The fifth step is to determine the number and size of the fields to be provided for the Narrative section 22 included for each Category data section. This field may be from 1,000 to 10,000 or more characters in size, depending upon the limitations imposed by the data base applications program being employed.

The sixth step is to decide if one or more Ancillary Data sections 23 should be included in the the records of the Subject Data Base 1, to accommodate still other types of information about the subject that need to be included. This section might include information concerning language skills, special licenses, or other types of information about the individual.

The seventh step is to include the Identification Symbol 24 data element under each Category data section, to serve as a reference for the characteristics of the subject being classified. If there is more than one Category data section contained in the Subject Data Base 1, there will be a separate Identification Symbol 24 for each Category data element 8, which may or may not reference different "access" or "gateway" persons.

The eighth step is to determine how the information is to be represented in the records of the Subject Data Base 1, after the various types of information which are to be included in the Subject Data Base 1 are determined. This task includes determining the types of fields to be used, and, if information is to be coded, what coding scheme(s) will be employed.

The ninth step is to determine the basic structure of the Subject Data Base 1. The Subject Data Base 1 may be incorporated into a single data base structure within the data base application program, or it may be more efficient to develop a structure that incorporates several relationally linked data bases (or a single data base with a plurality of relationally linked files, depending on the terminology used). Data base size, frequency and patterns of use, and retrieval speed are all factors which govern the choice of data base design.

As noted earlier, to maintain acceptable search and retrieval speed, it may be appropriate to subdivide the Subject Data Base 1 into a "parent" data base containing only the Biographical data section 5 and the Resume data section 7, which is then relationally linked with a series of "child" data bases, each containing appropriate constellations of Category data sections.

The Typology Data Base 2

Figure 3:
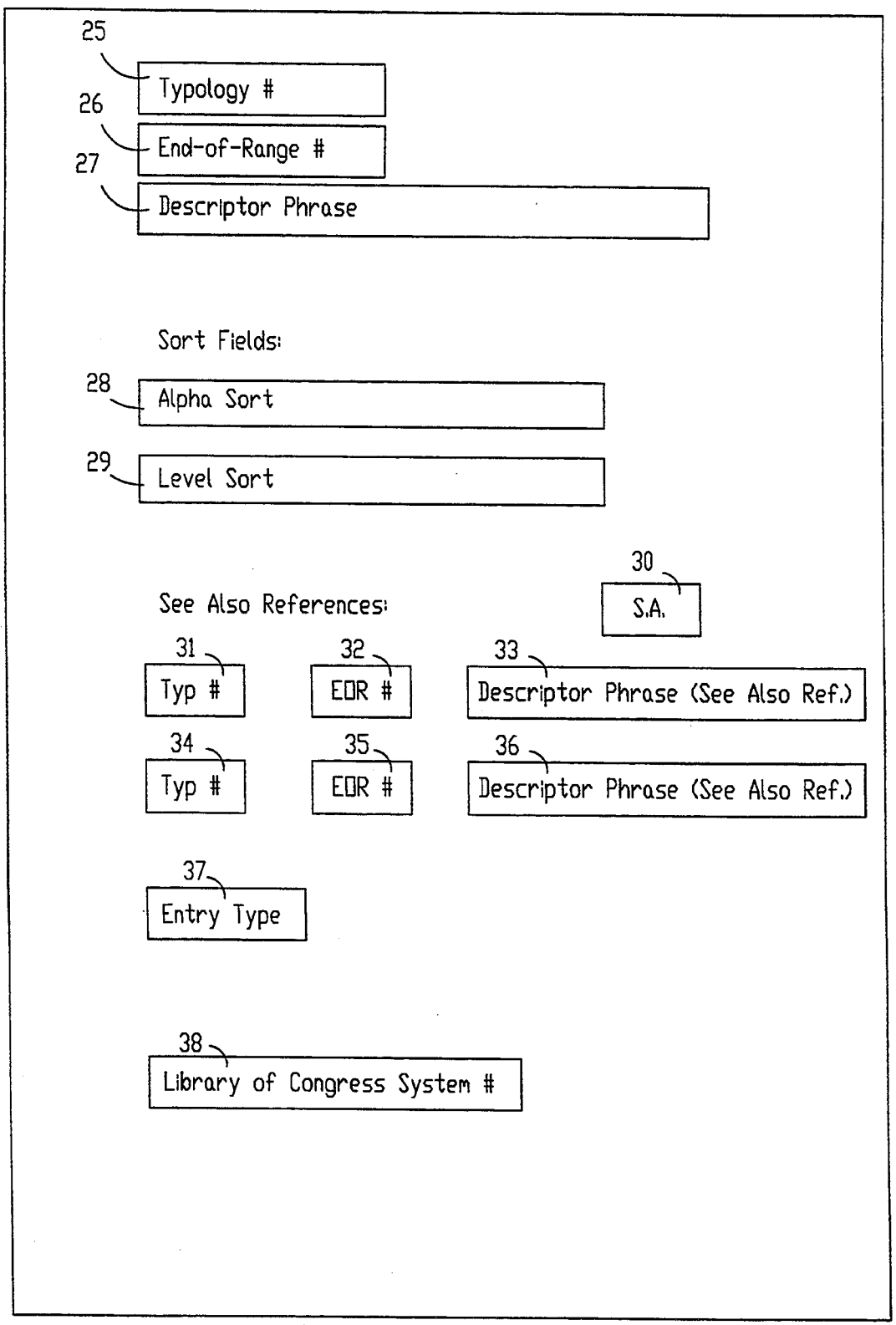
FIG. 3 is a diagram of the Typology Data Base 2, illustrating its various data elements.

FIG. 3 presents the contents of the Typology Data Base 2, which contains the records embodying the classification scheme upon which the entire Data Storage and Retrieval System is based.

Each record in the Typology Data Base 2 represents a single topic in this classification scheme: theoretically, there is a record in the Typology Data Base 2 for each of the estimated 600,000 topics contained in the Library of Congress Classification System.

In each Typology Data Base record 2, there are fourteen fields. The first field is the Typology Number 25, which is a 22-digit alphanumeric "number" based on the number for the similar topic in the Library of Congress Classification System, which is displayed in the Library of Congress Number field 38. A suitable algorithm/procedure for transforming a Library of Congress Number 38 into a Typology Number 25, and procedures for developing the remaining components of a complete Typology Data Base record, will be described later herein.

The second field in a Typology Data Base record is the End-of-Range Number 26, which is a 22-digit alphanumeric number based upon and/or interpolated from the Library of Congress Classification System numbers.

The third field in a Typology Data Base record is the Descriptor Phrase 27, which is a 60-character alphanumeric phrase describing a specific topic designated by the Typology Number. The Descriptor Phrase 27 is similar to and/or based upon the descriptors of the Library of Congress Classification System. Because of the self-indexing function incorporated into the Composite Catalog Data Base 4, it is sometimes necessary to expand upon the wordings of the descriptors from the Library of Congress Classification System to make the Descriptor Phrases 27 self-explanatory when viewed out of hierarchical context.

The next two fields in a record of the Typology Data Base 2 ere sort fields to facilitate the sort functions incorporated into the Composite Catalog Data Base 4. The fourth field is the Alpha Sort field 28, which is a 45-character alphanumeric phrase created to enable the system to perform accurate alphabetic sorts on the Descriptor Phrases 27. The Alpha Sort field 28 is based on and/or interpolated from the Descriptor Phrase 27. The Alpha Sort field 28 is created without indentation, capitalization, or the inclusion of articles of speech which may be incorporated into the Descriptor Phrase 27.

The fifth field is a Level Sort field 29, which contains a 2-digit number that reflects the hierarchical level of the topic within the classification scheme, and correlates with the level represented by the capitalization and indentation used in the Descriptor Phrase 27.

The sixth field in a record of the Typology Data Base 2 is the See Also Indicator field 30. This is a calculated field that remains blank unless at least one See Also Reference is provided, in which case all indicator appears in the field 30 to alert the user that at least one See Also Reference is cited in the record.

The next two groups of three fields each (3-33 and 34-46) provide Typology Numbers, End-of-Range Numbers, and Descriptor Phrases for See Also References which may be relevant to the topic described in the primary Descriptor Phrase 27 of that record. In the preferred embodiment of the Typology Data Base 2, there are provisions for two See Also References. For each See Also Reference, a separate, complete Typology Data Base record 2 also must be created or already exist.

The Data Storage and Retrieval system incorporates hi-directional or reciprocal See Also References. When a new See Also Reference record in the Typology Data Base 2 is created, the original record is cited as a See Also Reference in the new record. For example, if record A includes a See Also Reference that prompts the creation of record B, the Typology Number 31 and Descriptor Phrase 33 from record A become the first See Also Reference in record B.

The thirteenth field in the Typology Data Base 2 is the Entry Type field 37, which uses a single-digit number to reflect the type of entry this particular record is in the Composite Catalog Data Base 4. The three types of entries that can be made in the Composite Catalog Data Base 4 include:
1. A "Basic Outline" entry,
2. A Subject Entry representing a record in the Subject Data Base 1, and
3. A See Also Reference entry.

A "Basic Outline" entry in the Composite Catalog Data Base 4 is one included to illustrate the range and scope of the classification scheme embodied in the Typology Data Base 2, and to serve as a basic comprehensive outline of the classification system. The other two types of entries have been described previously.

The fourteenth and last field in each record of the Typology Data Base 2 is the Library of Congress Number 38, which is a field for entering and displaying the "original" number from the Library of Congress Classification System which best represents the topic presented in the Descriptor Phrase 27, and upon which the Typology Number 25 is based.

Typology Data Base 2 records must first be constructed before records can be entered into the Composite Catalog Data Base 4 and Subject Data Base 1. There are five steps involved in constructing the actual Typology Data Base records.

The first step in constructing an actual Typology Data Base record is to draft the 60-character, alphanumeric Descriptor Phrase 27. In creating the Descriptor Phrase 27, the person constructing the Typology Data Base 2 records should follow the form of the phrases contained the *Library of Congress Classification Schedules*, and the standard procedures for creating these phrases which are customarily associated with the Library of Congress classification process. Discussions of these standard procedures are widely available in basic library school text books dealing with the subject of cataloging materials using the Library of Congress Classification System.

Because the Composite Catalog Data Base 4 is a self-indexing data base, it may be necessary to add terms to the phrases appearing in the *Library of Congress Classification Schedules* to accurately present the topic being cataloged as it relates to other topics in the Library of Congress Classification System. For example, Descriptor Phrases 27 which present topics that are lower (more specific) in the hierarchical classification scheme may need to include a reference to the broader categories under which they are subsumed. It usually is best to include this type of reference as a parenthetical phrase at the end of the Descriptor Phrase 27.

The need for this additional detail will become immediately apparent when the Composite Catalog Data Base 4 is ordered in a non-hierarchical order using the Alpha Sort field 61, described later with reference to FIG. 5, as opposed to ordering the Data Base in its original hierarchical order using the Typology Numbers 44, also described later with reference to FIG. 5.

Following the conventions of the Library of Congress Classification System, appropriate capitalization and indentation should be used to reflect the hierarchical level of the topic being classified. The *Library of Congress Classification Schedules* present an appropriate model for determining the hierarchical level of a particular Typology Data Base 2 record.

The second step involved in constructing an actual Typology Data Base 2 record is to create the Typology Number 25 from the *Library of Congress Classification Schedules* or from other library cataloging resources. The Typology Number 25 is a modification of the number used in the Library of Congress Classification System. By using a modification of the Library of Congress number according to this invention, the Data Storage and Retrieval System can be implemented on personal computers, employing commercially available data base application programs.

The modifications to the original Library of Congress numbers which are incorporated into the Typology Number 25 and End-of-Range number 26 enable the query and sort routines of commercially-available, personal computer data base applications programs to correctly sort the records by Typology Number 25 and/or End-of-Range Number 26.

The Typology Number 25 and the End-of-Range Number 26 are both 22-digit alphanumeric numbers, ordered as shown in FIG. 6. For purposes of this description and in reference to FIG. 6, the items in the Typology Number 25 and the End-of-Range Number 26 are numbered 1 through 22 from left to right, and seven groups of Units are lettered A-G. To "convert" a Library of Congress "number" into a Typology Number 25 or to create an End-of-Range Number 26, the following algorithm is employed:

1. In the Library of Congress number, there are up to three letters that begin the Library of Congress designation. These letters are placed as Group A, (i.e., Units 1–3), and are stored flush left in Group A.

2. Next, in the Library of Congress number there are a series of numbers from 0 to 9999. These numbers are placed as Group B (i.e., Units 4–7), flush right, with no leading zeros (spaces will appear in Units 4–6 as appropriate).

3. In the conventional Library of Congress number there may next come a decimal point. In creating the Typology Number 25 or in creating the End-of-Range Number 26, a decimal point is placed as Unit 8 if the first decimal point is followed by one or more numbers. In creating the Typology Number 25 or in creating the End-of-Range Number 26, a decimal point is placed as Unit 13 if the first decimal point is followed by a letter. If no numbers or letters follow the first group of numbers placed as Group B (i.e., Units 4–7), then no decimal point is inserted in the Typology Number 25 or in the End-of-Range Number 26.

4. Following the first decimal point in the Library of Congress number there may come either more numbers up to four, or a modification of the conventional Cutter numbering scheme, beginning with a letter. If the next Library of Congress Unit begins with numbers, then in creating the Typology Number 25 or in creating the End-of-Range Number 26, those numbers, preceded by a decimal point in Unit 8, are placed in Group C as Units 9–12, flush left in Group C, with no trailing zeros.

5. If the Library of Congress number incorporates a Cutter number as part of the number attached to a particular topic, as contrasted with identifying a particular book, then in the Typology Number 25 or in the End-of-Range Number 26, the first letter of the Cutter number is placed as Group D (Unit 14), preceded by a decimal point in Unit 13. The Cutter member portion may or may not be preceded by numbers in Units 9–12, which, if present, are preceded by a decimal point in Unit 8.

6. If the Cutter number portion of the Library of Congress number includes additional numbers, these numbers are placed in the Typology Number 25 or the End-of-Range Number 26 as Group E (Units 15–19), flush left in Group E, with no trailing zeros 7. If the Cutter number portion of the Library of Congress number is a so-called "double Cutter number" incorporating two letters, then the second letter of the Library of Congress Cutter number is placed in the Typology Number 25 or in the End-of-Range Number 26 as Group F (Unit 20).

8. If the "double Cutter number" portion of the Library of Congress number incorporates one or two numbers following the second letter, then these numbers are placed in the Typology Number 25 or in the End-of-Range Number 26 as Group G (Units 21–22), flush left in Group G.

It should be noted that, although the Cutter numbers which are incorporated into the *Library of Congress Classification Schedule* are placed in the Library of Congress number as immediately following the first decimal point, if no numbers appear to the right of the first decimal point in the Library of Congress number, when creating the Typology Number 25 or the End-of-Range Number 26, the first letter in the Library of Congress Cutter number designation always begins with Unit 14 in the Typology Number 25 or the End-of-Range Number 26 and is always preceded by a decimal point in Unit 13.

The Typology Number 25 and the End-of-Range Number 26 are identical in form and structure. The Typology Number 25 contains tile same information as the number appearing in the *Library of Congress Classification Schedule* related to a specific topic, while the End-of-Range Number 26 is created to reflect the appropriate width of the range within the hierarchical nature of the Library of Congress Classification System, The *Library of Congress Classification Outline*, published by the Library of Congress as part of the Library of Congress Classification System, illustrates how the End-of-Range Number 26 is determined, For a particular *Library of Congress Classification Schedule*, e.g., Education, Music, Fine Arts, Agriculture, Technology, etc., the Typology Number 25 would be a number indicating the first entry in the *Library of Congress Classification Outline*, while the End-of-Range Number 26 would be a number representing one increment beyond the last item in the *Library of Congress Classification Outline* for a particular topic, For example, the End-of-Range Numbers 26 in all records in a Basic Outline may have a digit added to each number to extend the End-of-Range Number 26 beyond the range reported in the *Library of Congress Classification Outline* for a particular topic.

The End-of-Range Number 26 may be developed directly from the *Library of Congress Classification Outline* numbers, it may be interpolated from perusing the appropriate *Library of Congress Classification Schedule*, or it may be developed by the person creating the Typology Data Base 2 record.

Typology Data Base 2 records for highly specific Descriptor Phrases 27 which are being used to enter information from the Subject Data Base 1 in the Composite Catalog Data Base 4 will have the narrowest of ranges, thus appearing at the lowest hierarchical level in the classification scheme, typically level ten or lower.

The third step in creating a Typology Data Base 2 record is the creation of the Alpha Sort field 28. As described above, the Alpha Sort field 28 contains a 45-character, alphanumeric phrase which is based upon and/or interpolated from the Descriptor Phrase 27. The Alpha Sort field phrase 28 is created by omitting all indentation, capitalization, and articles of speech from the Descriptor Phrase 27. It is appropriate to alter/modify/edit the Alpha Sort field phrase 28 in any manner necessary to produce an appropriate alphabetic sort of the Typology Data Base 2 record.

Because of the capitalization, indentation, and the presence of articles of speech in the Descriptor Phrases 27, alphabetic sorts based the Descriptor Phrase field 27 do not produce useful alphabetic sorts of the records in the Composite Catalog Data Base 4. However, by creating special Alpha Sort field phrases 28 when the Typology Data Base 2 records are created, a self-indexing, alphabetic sort capacity can be added to the Composite Catalog Data Base 4.

The inclusion of the Alpha Sort field 28 as a component of the Typology Data Base 2 record enables the Data Storage and Retrieval System to function within the limitations of the typical personal computer data base application program, and obviates the necessity for the development of specialized data base software capable of performing useful alphabetic sorts on the phrases contained in the Descriptor Phrase field 27.

The fourth step in creating a Typology Data Base 2 record is to create the Level Sort field reference number 29. The Level Sort field 29 provides for the capacity within the Composite Catalog Data Base 4 to query the Composite Catalog Data Base 4 and display the contents of the Composite Catalog Data Base 4 at any given level within the hierarchical classification scheme.

As each Typology Data Base 2 record is created, the Descriptor Phrase 27 is developed with the appropriate capitalization and indentation to reflect a particular hierarchical level within the Classification Scheme. When this has been determined, the appropriate hierarchical level is recorded numerically in the Level Sort field 29.

The fifth and final step in creating a Typology Data Base 2 record is to determine if there are any appropriate See Also References which should be included, and to include them. See Also References may be indicated by the *Library of Congress Classification Schedules*, by Library of Congress "Cataloging-in-Publication" data, or may be suggested by the individual being classified.

If it is appropriate to include a See Also Reference, the appropriate Descriptor Phrase is included in the See Also Descriptor Phrase 33 and the accompanying Typology Number 31 and End-of-Range Number 32 are included as well. Provision has been made in the example Typology Data Base record in FIG. 3 for a second See Also Reference 34–36.

A new Typology Data Base record must be created for each new See Also Reference, if an appropriate record does not already exist in the Typology Data Base. Because the system incorporates bidirectional or reciprocal See Also References, when a new See Also Reference record is created in the Typology Data Base 2, the original record is cited as a See Also Reference in the new record.

Since records from the Typology Data Base 2 are used for the purpose of adding entries to the Composite Category Data Base 4, the Entry Type 37 is determined, entered if appropriate into the Entry Type Field 37 in the Typology Data Base record, and in the Entry Type field 50 in the Composite Catalog Data Base 4.

The Identifier Data Base 3

Figure 4:
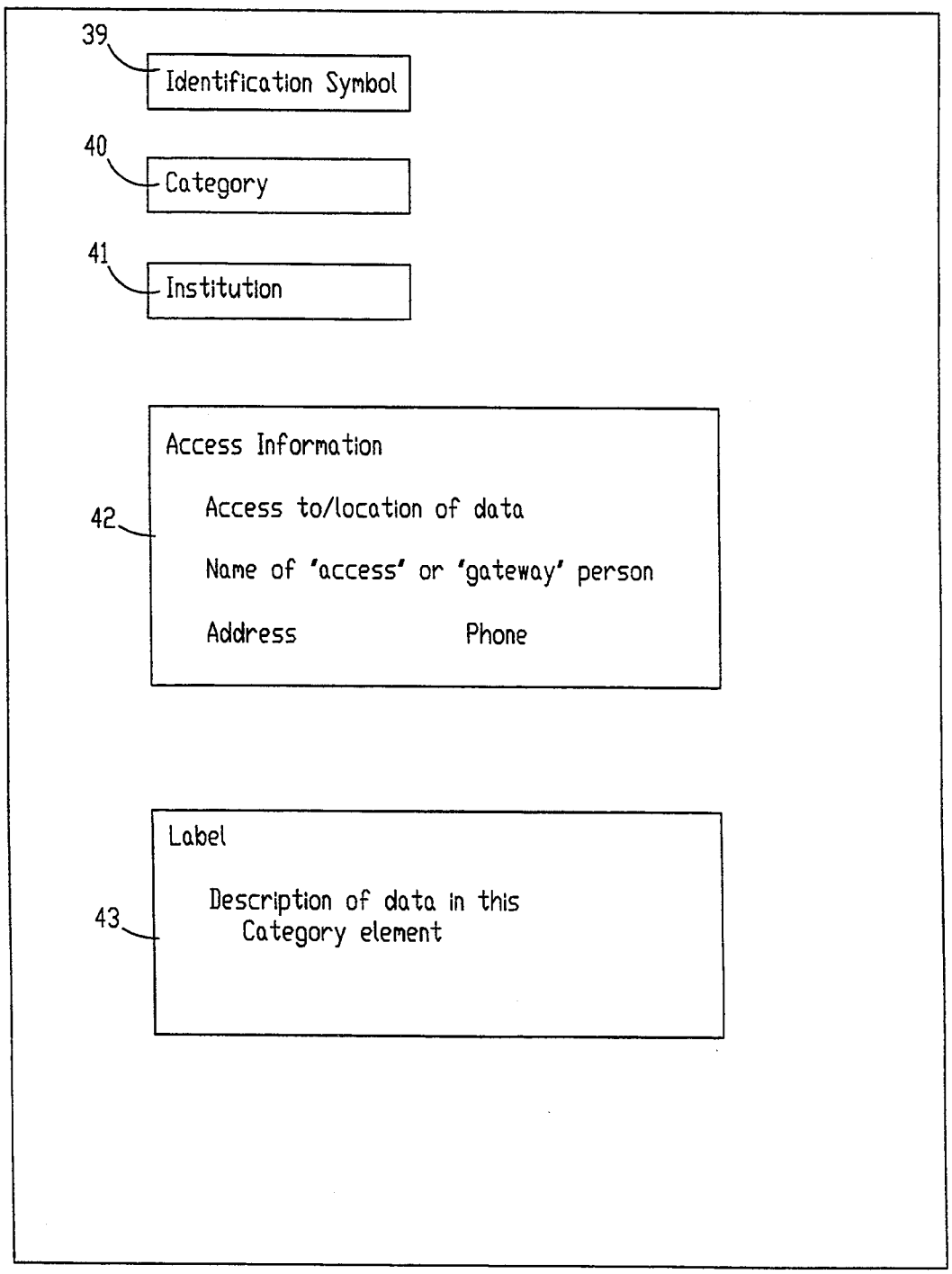
FIG. 4 is a diagram of the Identifier Data Base 3, illustrating its various data elements.

As illustrated in FIG. 4, the next data base in the preferred embodiment of the Data Storage and Retrieval System is the Identifier Data Base 3, which consists of descriptive information that facilitates access to the information contained in the Subject Data Base 1 by indicating: (a) the location of the institution maintaining the appropriate Subject Data Base; (b) the name of the institutional "access" or "gateway" person; and, if appropriate, (c) a Label 43 describing the information contained in the specific Category data section in the Subject Data Base.

The Identifier Data Base 3 includes three data sections. The first section identifies the record and includes an Identification Symbol data element 39 which corresponds to a particular combination of a category and an institution. The Category field 40 and Institution field 41 then identify the category and institution combination to which this record corresponds. The Identification Symbol 39 contains the same information as the Identification Symbols 24 and 52 in the Subject Data Base 1 and Composite Catalog Data Base 4. The Category field 40 contains the same information as in the Category field 8 of the Subject Data Base and the Category field 47 of the Composite Catalog Data Base. The Institution field 41 contains the same information as the Institution field 6 in the Subject Data Base 1.

The purpose of the Identifier Data Base 3 is to present the user of the Composite Catalog Data Base 4 with the information contained in the second section of each record of the Identifier Data Base, i.e., the Access Information section 42. The Access Information section 42 contains information necessary to identify and access the appropriate Subject Data Base in a multi-institutional implementation of the Data Storage and Retrieval System, or in a single-institution implementation with several "access" points.

The Access Information section 42 contains information which identifies both the location of the individual whose listing appears in the Composite Catalog Data Base 4, and identifies the "access" or "gateway" person at that institution with whom contact can be made to gain access to the individual represented by the topic of interest. The information included in the Access Information section 42 will be contained in separate fields.

In addition, the Identifier Data Base 3 may also have a Label section 43 containing a description of the nature or type of information represented by a particular category of data.

The Identifier Data Base records must be constructed before topic entries can be made to the Composite Catalog Data Base 4. There are four steps involved in constructing the Identifier Data Base 3, and these will now be described.

The first step is to create Identifier Data Base records for all possible combinations of Institutions and Categories identified in the Subject Data Base 1, and to assign a unique Identification Symbol 39 to each combination. It will be helpful if the Identification Symbol 39 assigned to each combination readily communicates the name of the specific Institution and the particular subject matter associated with the Category. For example, if the Institution 41 is Kansas State University and the Category 40 is Economic Development, an appropriate Identification Symbol 39 might be "KSUecd".

The second step is to create one "trailer" record and assign to it a unique Identification Symbol 39 that is innocuous. This "trailer" record then will be the Identifier Data Base 3 record that is relationally linked with Composite Catalog Data Base records such as Basic Outline entries that do not represent a topic of interest associated with an individual listed in the Subject Data Base.

The third step is to enter the appropriate information concerning the "access" or "gateway" person associated with each combination, e.g., name, department, position, institutional address, institutional telephone number, and any other information appropriate for inclusion. This information is, of course, contained in separate data base fields. Since it is the intention of the Data Storage and Retrieval System to protect the privacy of the individuals listed in the Subject Data Base, it is anticipated that access to the information included in the Subject Data Base will be provided via the "access" or "gateway" person.

The fourth step is to enter the appropriate descriptive information in each Label data section 43 in each record, to accurately describe the subject matter of topics being catalogued by each Category. This information will inform the person perusing the Composite Catalog Data Base 4 under what category the individual had indicated interest/expertise.

The Data Storage and Retrieval System is designed to operate in such a way that when a user accesses the Composite Catalog Data Base 4 and moves through the Composite Catalog Data Base record-by-record, the records in the Identifier Data Base 3 that are relationally linked to the records in the Composite Catalog Data Base via the Identification Symbols 39 and 52 are displayed. Thus, as a user reviews the records in the Composite Catalog Data Base, the user will automatically be presented with the information about who the "access" or "gateway" person is at the institution where the individual represented in the Composite Catalog Data Base works, and will also be shown a description of the category to which each topic relates.

The Composite Catalog Data Base

Figure 5:
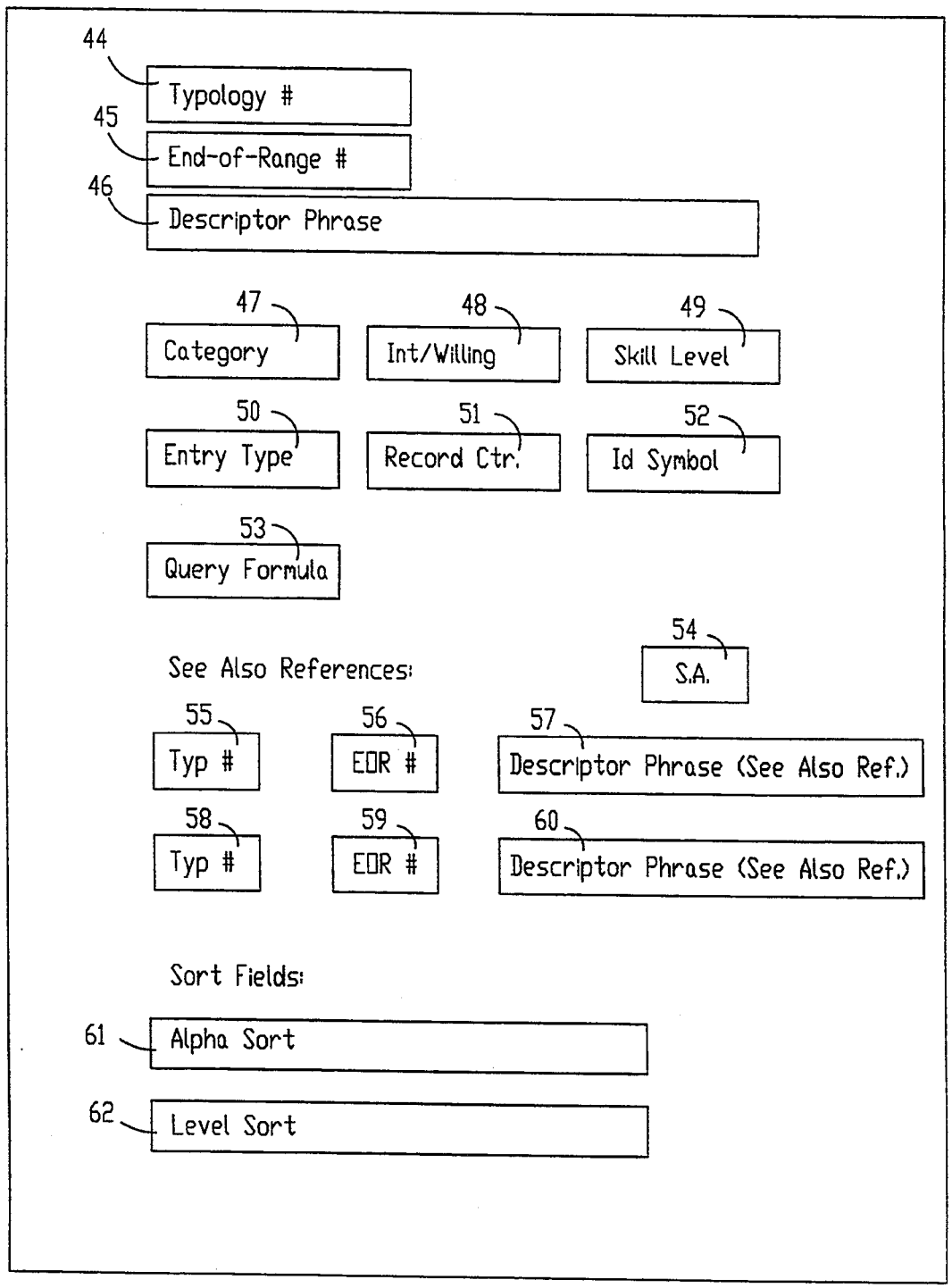
FIG. 5 is a diagram of the Composite Catalog Data Base 4, illustrating its various data elements.

As illustrated in FIG. 5, the fourth component of the Data Storage and Retrieval System is the Composite Catalog Data Base, which is a self-indexing catalog that: (a) identifies topics for which Subject Data Base records exist; (b) incorporates a link to the Identifier Data Base; and (c) conveys, in outline form, the basic nature of the classification system contained in the Typology Data Base. In its preferred embodiment, the Composite Catalog Data Base consists of records which include all of the data elements included in a Typology Data Base record, plus three fields from the Subject Data Base.

Records are included in the Composite Catalog Data Base for one of three purposes. When a new Composite Catalog Data Base is constructed, an appropriate number of Typology Data Base records are included in the Composite Catalog Data Base as a "Basic Outline" to adequately represent the classification system as embodied in the Typology Data Base. In a typical situation, this will mean including between 1,000 and 2,000 Typology Data Base records in the Composite Catalog Data Base to serve as a "Basic Outline". The creation of a Basic Outline is described in detail later herein.

The second reason records in the appropriate format are included in the Composite Catalog Data Base is to represent the Descriptor Phrases 11, 15 and 19 from the various Category data sections representing topics descriptive of the individuals cataloged in the records which make up the Subject Data Base.

The third reason that records may be included in the Composite Catalog Data Base is to provide for See Also References 31–33 and 34–36, as defined in the Typology Data Base records.

Provision for indicating the type of record is incorporated in the Entry Type 50 field in the Composite Catalog Data Base.

In each Composite Catalog Data Base record, there are nineteen fields. The Typology Number 44, End-of-Range Number 45 and Descriptor Phrase 46 are all copied frown the appropriate record in the Typology Data Base 2.

The fourth field in the records of the Composite Catalog Data Base is the Category field 47. Data from the appropriate Category field 8 from the Subject Data Base 1 is copied to this field if this Composite Catalog Data Base record reflects entry in the reflects an entry in the Subject Data Base 1. If such is the case, then the Composite Catalog Data Base Category field 47 is the same as the appropriate Category data field 8 from the Subject Data Base. In this case also, the Interest/Willingness field 48 and the Skill Level field 49 in the Composite Catalog Data Base report the data from the appropriate fields 9 and 12 from the record in the Subject Data Base 1.

The seventh field in each record of the Composite Catalog Data Base is an Entry Type field 50, which describes the type of entry represented by a particular record in the Composite Catalog Data Base.

The Record Counter field 51, the eighth field in the Composite Catalog Data Base, facilitates record entry and deletion from the Composite Data Base, as will be described in more detail below with reference to FIG. 9.

The Identification Symbol field 52, the ninth field in the Composite Catalog Data Base, is reported from the appropriate Identification Symbol field 24 for Subject Data Base entries, and serves as the relational link to the Identifier Data Base.

The Query Formula Element field 53, the tenth field in the Composite Catalog Data Base, is used to mark a record as an element to be used in constructing queries of the Subject Data Base. This process is described below with reference to FIG. 11.

The See Also field 54, the eleventh field in the Composite Catalog Data Base 4, is a calculated field similar in function to the See Also field 30 in the Typology Data Base 2.

The twelfth through the seventeenth fields in the Composite Catalog Data Base 4 correspond to the two See Also References, and are brought forward from the See A1 so References 31–33 34–36 included in the Typology Data Base record.

Similarly, the Alpha Sort field 61 and the Level Sort field 62, the eighteenth and nineteenth fields in the Composite Catalog Data Base 4, are brought forward from the Typology Data Base sort fields 28 and 29.

Before the Data Storage and Retrieval System can be implemented, the Composite Catalog Data Base must be constructed and records from the Typology Data Base representing an appropriate Basic Outline of the classification scheme must be entered into the Composite Catalog Data Base. There are three steps involved in constructing the Composite Catalog Data Base.

One of the strengths of the Data Storage and Retrieval System is the robustness of the 600,000-topic classification scheme incorporated into the system. However, such a complex classification scheme can be difficult for the first-time user to grasp at first glance. Thus, the first step is to determine the scope and level of detail for constructing a Basic Outline appropriate to the cataloging task for which the Data Storage and Retrieval System is being constructed.

Because the Data Storage and Retrieval System utilizes the Composite Catalog Data Base 4 as the primary access vehicle for the system and because the Composite Catalog Data Base is separate from the Subject Data Base 1, it is possible to use the Composite Catalog Data Base to communicate to the user, in outline form, the basic nature of the hierarchical classification system contained in the Typology Data Base 2. This is accomplished by incorporating into the Composite Catalog Data Base selected records from the Typology Data Base that are not necessarily representative of entries in the Subject Data Base. These records, designated in the Entry Type field 50 as Basic Outline entries, are chosen to create a framework, a classification structure into which the topic-related records representing individuals cataloged in the Subject Data Base are inserted. The concept is similar to labeling a group of empty file folders with an appropriate set of headings into which one proposes to sort a stack of letters.

A major advantage of the Data Storage and Retrieval System is that the Basic Outlines can be tailored to the needs of the task. For example, if the Data Storage and Retrieval System is being used to catalog individuals who are primarily involved in the creative and performing arts, an extensive list of relevant headings can be incorporated into the Basic Outline, while headings dealing with the physical sciences can be de-emphasized or completely eliminated.

The *Library of Congress Classification Outline*, with suitable updated corrections, is an excellent example of a general, all-purpose, comprehensive Basic Outline of the classification scheme incorporated into the Data Storage and Retrieval System.

A comprehensive Basic Outline constructed following the *Library of Congress Classification Outline* will contain approximately 1,455 records, incorporating twenty major categories.

The second step in creating the Composite Catalog Data Base is to enter the appropriate Typology Data Base records that constitute the designated Basic Outline into the Composite Catalog Data Base 4, having inserted the correct indicator in the Entry Type field 50.

Because a Basic Outline is incorporated into the Composite Catalog Data Base, the user can sort the Composite Catalog Data Base at its various hierarchical levels and immediately grasp the essential nature of the classification scheme that undergirds the entire Data Storage and Retrieval System.

The third step in creating the Composite Catalog Data Base is to create the appropriate keyboard macros, sort routines, and key files that facilitate displaying the Composite Catalog Data Base sorted numerically, alphabetically, and hierarchically.

Operation of the Data Storage and Retrieval System

To implement and use the Data Storage and Retrieval System in its preferred embodiment, six processes are involved:

1. The Data Collection and Entry process
2. The Cataloging process
3. The System Implementation process
4. The Identification process
5. The Search and Retrieval process
6. The System Maintenance process Each of these processes will now be separately described.

1. The Data Collection and Entry Process

The Data Collection and Entry process involves creating a Subject Data Base 1 record and entering data provided by the subject.

The primary Data Collection and Entry task involves entering the subject matter information obtained from the individual to be included in the Subject Data Base record. There are at least three methods for collecting and entering the information regarding these individuals.

A first method involves the person who is going to catalog the information directly entering the data into the Subject Data Base 1 on the personal computer while interviewing the subject.

A second method involves the subject entering the information directly into the Subject Data Base while seated at the personal computer.

A third method involves the use of printed questionnaires, in which the subject either responds directly to the questionnaire or responds to questions presented by an interviewer who then records the answers on the questionnaire. At a later date, the information is then transferred from the printed questionnaire response sheet to the Subject Data Base record.

Regardless of the method employed to collect the data, the individual being included in the Subject Data Base will provide all information except for three data elements. The individuals being included in the Subject Data Base will not provide the Typology Number 10, the Record Counter 13, or the Identification Symbol 24.

Assuming that the Subject Data Base has provided for an adequate number of opportunities to indicate specific interests under each category, then as many Descriptor Phrases 11, 15, 19, etc., as necessary may be used to describe the interests, skill levels, abilities, characteristics, etc., of a particular individual for that category.

It should be noted that this process of cataloging is dissimilar to the process of cataloging a book, in which a single Library of Congress number must be assigned to a particular book. In the case of an individual being included in the Data Storage and Retrieval System, multiple specific topics at varying levels of specificity may be used to describe that individual in each category.

As described in detail earlier, it is possible to construct a Subject Data Base 1 so that it can incorporate as many Category data sections as are necessary to accomplish the purposes for which the Data Storage and Retrieval System is being created. The scope of the Data Storage and Retrieval System is only limited by the needs and purposes identified by the institution and the willingness of the individuals to provide the necessary information.

This process is, of course, subject to the limitations imposed during the design of the Subject Data Base in establishing the number of Category data sections included in the records of the Subject Data Base, and the number of topics provided for in association with each Category data section.

Figure 8:
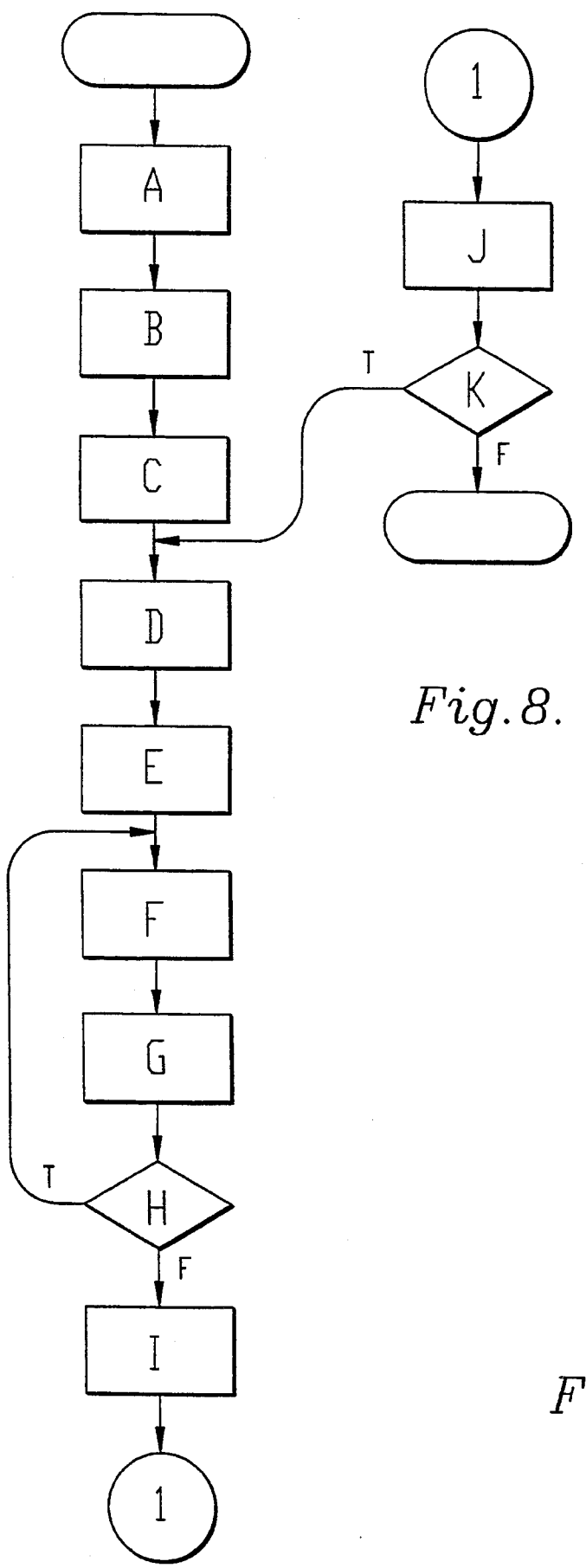
FIG. 8 is a flow chart illustrating the Data Collection and Entry process according to the present invention.

As illustrated in FIG. 8, there are eleven steps involved in the Data Collection and Entry process. The following steps are taken to initiate the process of constructing a single Subject Data Base record.

Step A in the Data Collection and Entry process is to create a new record in the Subject Data Base 1. Step B is to enter the data in the Biographical data element 5 in the Subject Data Base record, and step C is to enter the data in the Resume data element 7.

Step D is to move to the first (or next) Category data section. Step E is to enter the appropriate response in the Interest/Willingness field 9. Step F in the Data Collection and Entry process is to enter the appropriate phrase in the Descriptor Phrase field 11, and step G is to enter the appropriate response in the Skill Level field 12.

Step H in the Data Collection and Entry process is determine if there are additional Descriptor Phrases 15, 19, etc., to be entered under this Category data section. If "True", then the procedure advances to Step F. If "False", then the procedure advances to Step I.

Step I is to enter the appropriate response in the Narrative Description field 22, and Step J is to enter the appropriate responses in the Ancillary Data field 23.

Step K is to determine if there is another Category data section included in the Subject Data Base 1. If "True", the procedure advances to Step D, and if "False" the Data Collection and Entry procedure is completed for this subject.

2. The Cataloging Process

Once the Data Collection and Entry process has been initiated, then the Cataloging process can commence. While it is likely that some sequencing of these two processes will occur naturally, initiating the Cataloging process does not have to wait until the Data Collection and Entry process is completed with respect to all of the individuals to be entered into the system.

The Cataloging process involves creating a complete Composite Catalog Data Base record for each of the topics listed under a Category data section in the Subject Data Base record, and adding the Typology Numbers 10 to the associated Descriptor Phrases 11 in the Subject Data Base record.

The Cataloging process is based on the classification scheme of the Data Storage and Retrieval System, which is embodied in the Typology Data Base 2. As noted in the earlier description of the Data Storage and Retrieval System, the elements of the Typology Data Base form the classification scheme upon which the entire system is based. The Typology Data Base 2, in turn, has its foundation in the Library of Congress Classification System, as represented by the published *Library of Congress Classification Schedules*, the *Library of Congress Classification Outline*, Library of Congress MARC (Machine Readable Cataloging) records, and/or previously cataloged materials, including Library of Congress "Cataloging-in-Publication" documentation.

Theoretically, the Typology Data Base may be made up of the more than 600,000 topics currently included in the Library of Congress Classification System. In practice, the actual Typology Data Base records may be created in anticipation of the Cataloging process, or as the records are needed to complete the Subject Data Base records and to construct the Composite Catalog Data Base records.

As the use of the Data Storage and Retrieval System expands, more and more Typology Data Base records will be created. The existence of an ever-expanding Typology Data Base will prove to be an increasingly useful component of the System, since the existence of previously-developed Typology Data Base records will dramatically reduce the time that it takes to complete the cataloging process for a specific Subject Data Base record.

Figure 9:
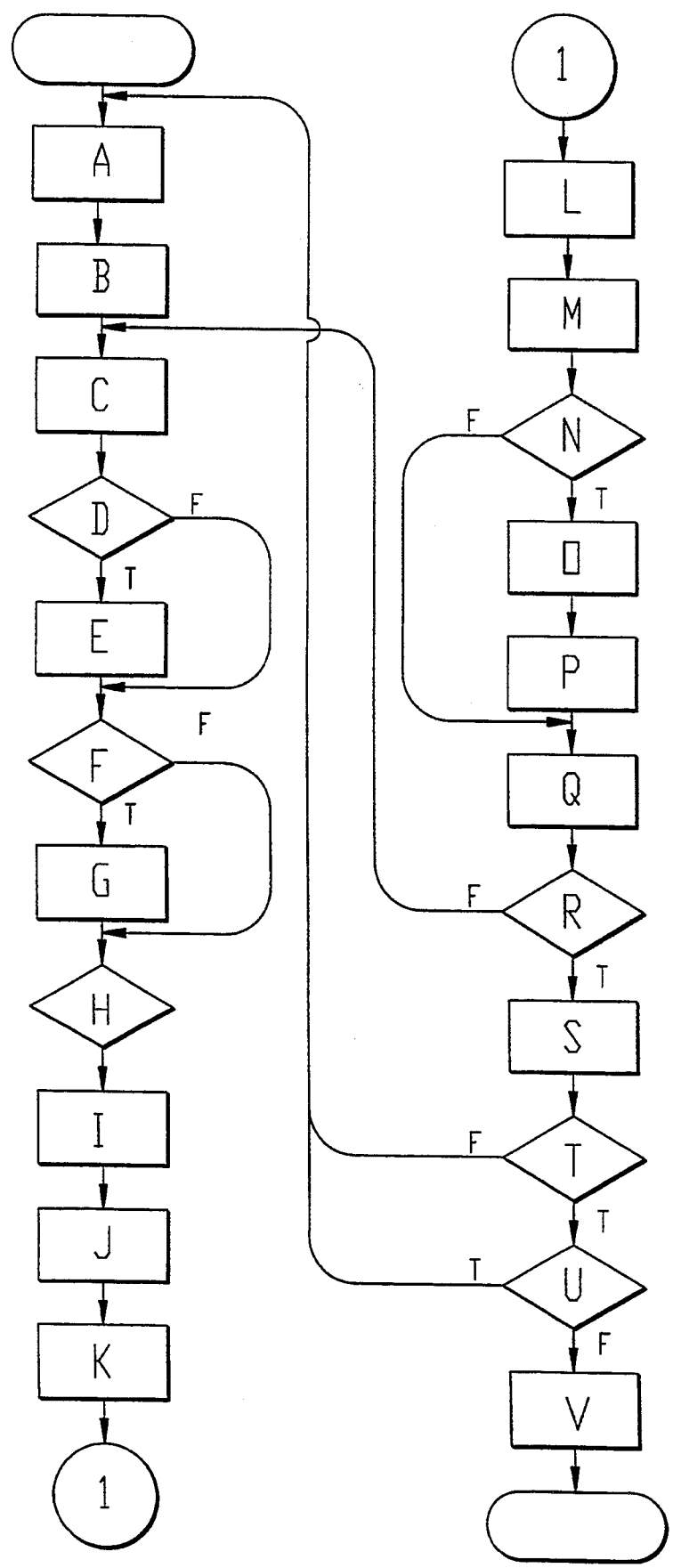
FIG. 9 is a flow chart illustrating the Cataloging process according to the present invention.

As illustrated in FIG. 9, there are twenty-two steps involved in the Cataloging process, and these will be described in the context of completing the Cataloging process with a single Subject Data Base record.

Step A in the Cataloging process is to search the records of the Identifier Data Base 3 for a match on both the Institution field 6 and Category field 8 in the Subject Data Base record, and Step B is to copy the appropriate Identification Symbol 39 from the matching Identifier Data Base record to the Identification Symbol field 24 in the Subject Data Base record.

Step C is to search the Descriptor Phrase fields 27 in the Typology Data Base records to find a match with the Descriptor Phrase field 11 associated with the topic being cataloged in the Subject Data Base record. Step D is to determine if the search in Step C has failed. If "True", the procedure advances to to Step E, and if "False" the procedure advances to to Step F.

To catalog each topic entry under a particular Category data section, a complete Typology Data Base record must exist. If the Typology Data Base record is not available for use, then a new, appropriate Typology Data Base record must be created. Step E in the Cataloging process is to create a new Typology Data Base record. This process was described earlier in the discussion of the construction of the Typology Data Base 2. (It is important to note that the creation of a new Typology Data Base record may also necessitate the creation of associated See Also Reference Typology Data Base records, with the appropriate Entry Type 37 and 50 designation as a See Also Reference.)

Step F in the Cataloging process is to determine if the Entry Type field 37 in the Typology Data Base 2 is blank. IF "True", the procedure advances to Step G, and if "False", the procedure advances to Step H.

Step G is to enter the appropriate symbol to represent a Subject Entry in the Entry Type field 37 in the Typology Data Base record.

Step H in the Cataloging process is to copy the Typology Number 25 from the matching Typology Data Base record to the Typology Number field 10 in the Subject Data Base 1.

Step I in the Cataloging process is to create a new Composite Catalog Data Base record, and Step J is to copy all of the information from the relevant Typology Data Base record to the new Composite Catalog Data Base record.

Step K is to copy any See Also Reference Typology Data Base records to the Composite Catalog Data Base 4 that are associated with the relevant Typology Data base record.

Step L is to copy the appropriate data from selected Subject Data Base fields into the related Composite Catalog Data Base fields. The data from the Subject Data Base Category field 8 is copied to the Composite Catalog Data Base Category field 47. Similarly, the information from the Subject Data Base Interest/ Willingness field 9, the Ski 11 Level field 12, and the Identification Symbol field 24 are copied to the appropriate fields 48, 49 and 52 in the Composite Catalog Data Base.

Step M in the Cataloging process is to search the Composite Catalog Data Base for records with duplicate Typology Numbers 44. Step N is to determine if the search in Step M has failed. If "True", the procedure advances to Step O, and if "False", the procedure advances to Step Q.

Step O in the Cataloging process is taken when records with identical Typology Numbers 44 are identified in the Composite Catalog Data Base 4. The highest Record Counter 51 number Found is incremented with the predetermined value. Step P is to insert the incremented value from Step O in the Record Counter field 51 of the new Composite Catalog Data Base record. The new Record Counter number also is inserted in the appropriate Record Counter field 13 in the Subject Data Base record.

If the response to Step N is "False", then this is the first occurrence of a record in the Composite Catalog Data Base with this specific Typology Number 44. The Record Counter field 51 is left blank, as is the Record Counter field 13 in the Subject Data Base, and the procedure advances to Step Q.

Step Q in the Cataloging process is to go to the next Descriptor Phrase 15, 19, etc., in the Subject Data Base Category data section that is being cataloged. Step R is to determine if the next Descriptor Phrase 15 is subsumed under the same Category data section, or if the next Descriptor Phrase 15 is grouped under a different Category data section; i.e., has the Category changed? If "False", the procedure advances to Step C, and if "True" the procedure advances to Step S which is to move to the next Category data section in the Subject Data Base.

Step T in the Cataloging process is to determine if the end of the Category data sections has been reached, i.e., are there any more Category data sections? If "False", the procedure advances to Step A. The Cataloging process is continued until all of the topics listed under all of the Category data sections contained in the Subject Data Base record have been cataloged, so that if the test at Step T is "True", the procedure advances to Step U.

Step U in the Cataloging process is to determine if there is another Subject Data Base record to be cataloged. If "True",the procedure advances to step A, and if "False", it advances to Step V, which is to update the sorting routines and key files that facilitate sorting and viewing the Composite Catalog Data Base numerically, alphabetically, and hierarchically. This is the final step in the Cataloging process.

3. The System Implementation Process

The System Implementation process involves taking the four major components of the Data Storage and Retrieval System and integrating them into a functioning system that will make it possible for a user to employ the System to identify and contact an individual with the appropriate interest, skills, abilities, and/or resources necessary to assist the user in accomplishing a specific task.

To understand the role of the Composite Catalog Data Base in the process of ultimately identifying the person with the appropriate interests, knowledge, skills, and/or abilities, one must also understand how the Data Storage and Retrieval System is designed to work.

In a single-institution mode, the Data Storage and Retrieval System is ready for use when the construction of the Subject Data Base 1 and the Composite Catalog Data Base 4 are completed.

Figure 10:
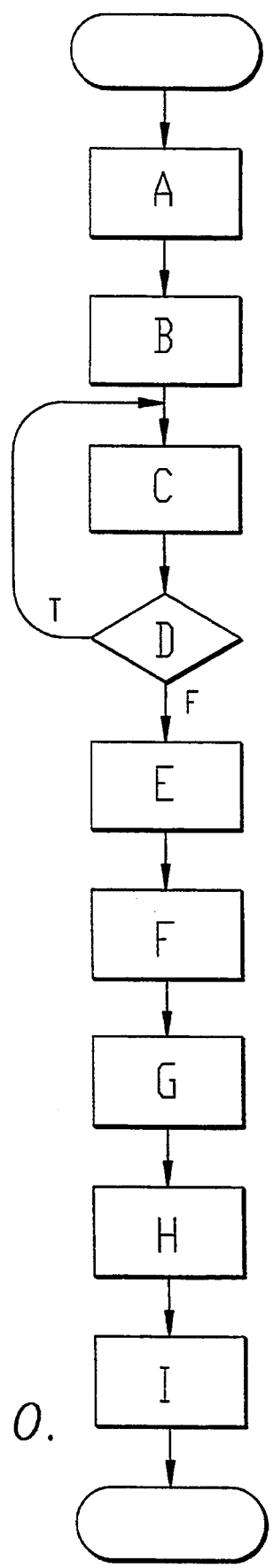
FIG. 10 is a flow chart illustrating the System Implementation process according to the present invention.

In the multi-institution mode, implementation of the Data Storage and Retrieval System requires concatenating all of the Composite Catalog Data Base files from all of the participating institutions, as illustrated in FIG. 10. Once each institution has completed construction of its Subject Data Base 1 and its Composite Catalog Data Base 4, then it is possible for those responsible for integrating the entire System to assemble an operational System by creating a multi-institution, System Composite Catalog Data Base 4. This is accomplished by concatenating all of the Composite Catalog Data Bases from all of the participating institutions into a single, multi-institution System Composite Catalog Data Base 4. This produces a single System Composite Catalog Data Base 4, which contains every single entry representing all of the individuals at all of the institutions that are participating in the multi-institution system.

It may be desirable to change the sequential order of the records in the concatenated System Composite Catalog Data Base by re-ordering the records by Typology Number 44. With some data base applications programs, it may be necessary to copy the newly-ordered records to a new version of the System Composite Catalog Data Base 4 to maintain the revised, sequential order.

The System Composite Catalog Data Base 4 is then distributed to the participating institutions, and to such other access points as have been designated by the system managers.

As illustrated in FIG. 10, there are nine steps involved in the System Implementation process, to complete the process of creating the System Composite Catalog Data Base 4.

Step A in the System Implementation process is to create the System Composite Data Base 4 by incorporating selected Typology Data Base 2 records which constitute an appropriate System Basic Outline.

Step B is to obtain the Composite Catalog Data Bases 4 from all of the participating institutions. Step C is then to concatenate the first/another institutional Composite Catalog Data Base 4 with the System Composite Catalog Data Base 4.

Step D is to determine if there is another institutional Composite Catalog Data Base 4. If "True", the process advances to Step C, and if "False", the process advances to Step E where the System Composite Catalog Data Base 4 is reordered by Typology Number 44 to create a revised, sequential order of the records.

Step F in the System Implementation process is to delete all of the records that duplicate the System Basic Outline entries in the System Composite Catalog Data Base 4, and Step G is to delete all of the duplicate See Also References in the System Composite Catalog Data Base 4.

Step H is to distribute the System Composite Catalog Data Base 4 to the participating institutions and to other appropriate access points, and Step I is for each institution to substitute the System Composite Catalog Data Base 4 for its institutional Composite Catalog Data Base 4.

4. The Identification Process

The Identification process involves searching the Composite Catalog Data Base 4 to perform three basic activities. The first activity is to identify appropriate topics to be used in constructing query routines. The second activity involves formulating Subject Query Formulas, which will be used in the subsequent Search and Retrieval process to construct Subject Query Routines. The third activity involves identifying the locations of the Subject Data Bases 1 to be searched.

The Identification process, which is accomplished by searching the Composite Catalog Data Base 4 for a single institution or by searching the System Composite Catalog Data Base 4 for a multi-institution system, enables the public user to select the appropriate topics to be used in constructing queries of the Subject Data Base 1, and to identify which Subject Data Bases 1 are to be searched.

For the purposes of this discussion, the term Composite Catalog Data Base 4 will be used to represent both the Composite Catalog Data Base 4 in the single-institution mode, and the System Composite Catalog Data Base 4 in the multi-institution system mode.

Figure 11:
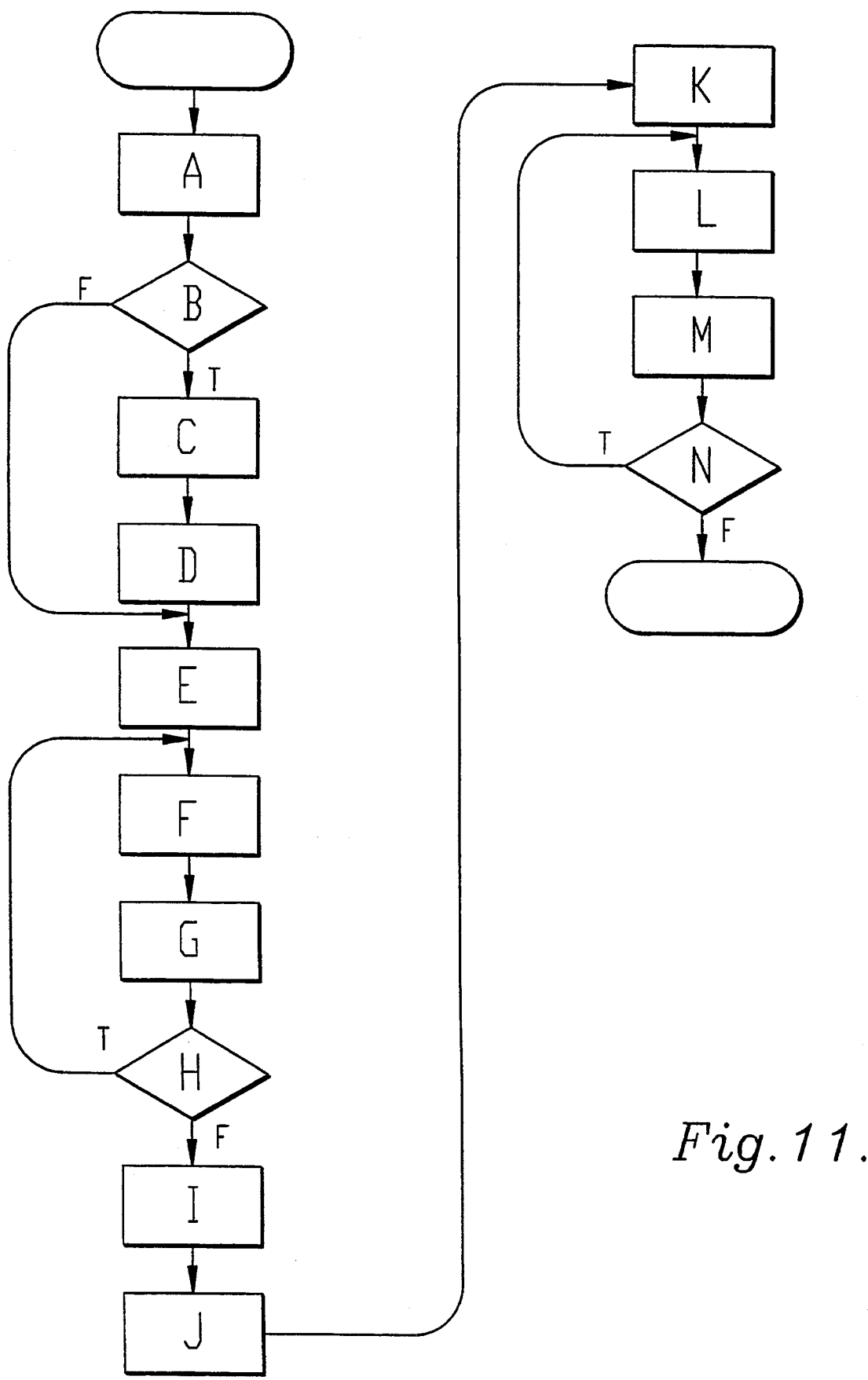
FIG. 11 is a flow chart illustrating the Identification process according to the present invention.

As illustrated in FIG. 11, there are fourteen steps involved in the Identification process. These are steps involved in searching the Composite Catalog Data Base 4 to identify and select the appropriate topics to be used, and in formulating Subject Query Formulas to be used in searching the appropriate Subject Data Bases 1.

Step A in the Identification process involves identifying selected topics for use in temporarily focusing the scope of the Composite Catalog Data Base 4 by reviewing the Descriptor Phrases 46.

The query and sort capabilities of the data base applications program can be employed to temporarily focus the scope of the Composite Catalog Data Base 4 during the process of reviewing its contents. If a search can be limited to specific topic areas, the number of Composite Catalog Data Base records to be initially reviewed can be significantly reduced by ordering the Composite Catalog Data Base 4 to include just those records related to the topics in question.

Step B in the Identification process is to determine if topics have been identified in Step A. If "True", the process advances to Step C, where a Focus Query Routine is created, the topics identified in Step A which will temporarily focus the scope of the review of the Composite Catalog Data Base 4. If the test in Step B is "False", the process advances to Step E.

Step D in the Identification process is to Order the Composite Catalog Data Base 4, using the Focus Query Routine created in Step C.

Step E in the Identification process involves reviewing the Composite Catalog Data Base record Descriptor Phrases 46 to select the appropriate topics to be used in formulating Subject Query Formulas. This review can be accomplished by perusing the Composite Catalog Data Base in its Browse Mode.

As illustrated in FIG. 7, the Browse Mode presents the Composite Catalog Data Base records to the user in a columnar format, 18 lines at a time, with the appropriate fields from each record displayed on a single line. The entire set of available Composite Catalog Data Base records can be viewed by scrolling or paging up and down through the data base. To see the entire record entry, e.g., to review a See Also Reference, the information in the window may have to be scrolled to the left.

In the Browse Mode, the Composite Catalog Data Base records can be ordered numerically by using the Typology Number 44, or ordered alphabetically using the Alpha Sort field 61. Additionally, using the Level Sort field 62, the Composite Catalog Data Base 4 can be viewed at any of the hierarchical levels incorporated into the classification scheme.

Based upon his own requirements, the user can then select the appropriate topics to be used in formulating the Subject Query Formulas, and also can determine at what hierarchical level the searches are to be conducted.

As the user peruses the Composite Catalog Data Base 4, the user may wish to pay attention to the linked Identifier Data Base records to ascertain which Subject Data Bases 1 at which institutions contain records for individuals whose specific Descriptor Phrases 11 coincide with or are subsumed under the topics chosen by the user for formulating Subject Query Formulas.

Step F in the Identification process involves selecting a topic at an appropriate hierarchical level from the Composite Catalog Data Base. Step G is to mark the topic selected in Step F by entering the appropriate symbol in the Query Formula field 53 of the record in the Composite Catalog Data Base 4.

Step H in the Identification process is to determine if there are additional topics to be selected. If "True", the process advances to Step F, and if "False", to Step I.

Step I in the Identification process involves searching the Composite Catalog Data Base to select those records with the appropriate symbol in the Query Formula field 53, and Step J involves formulating a Subject Query Formula, employing the information from the records selected in Step I. The necessary information from the selected and marked records is transferred directly to model multi-section Subject Query Formulas, and is collated for transmission to those assisting in the development of queries of the appropriate Subject Data Bases.

Step K in the Identification process involves identifying the appropriate Subject Data Bases to be queried, using the symbols in the Identification Symbol field 52 of the Composite Catalog Data Base records to search the Identifier Data Base for the records with the matching symbols in the Identification Symbol field 39.

Step L is to review the Access Information data element 42 in the appropriate Identifier Data Base record identifying the associated "access" or "gateway" person providing access to the Subject Data Base 1, and Step M involves transmitting the constructed Subject Query Formulas and the collated information to the appropriate "access" or "gateway" person providing access to an appropriate Subject Data Base.

Step N in the Identification process is to determine if there is an additional Subject Data Base to be searched. If "True", the process advances to Step L. If "False", the Identification process is completed.

5. The Search and Retrieval Process

The Search and Retrieval process focuses on accessing the appropriate Subject Data Bases, and querying the Subject Data Bases to obtain the needed information. The Search and Retrieval process involves constructing effective Subject Query Routines which are based on the Subject Query Formulas formulated during the Identification process, retrieving information concerning the identified subjects, and reporting the information to the user.

The simplest Subject Query Routine involves a Boolean algebraic phrase written as a "multiple-query" formula, where the first Typology Number field 10 listed under the appropriate Category data section is set as "Equal To or Greater Than" the Typology Number 44 from the selected Composite Catalog Data Base record, and is set as "Equal To or Less Than" the End-of-Range Number 45 from the same selected Composite Catalog Data Base record. This Subject Query Routine is extended to cover all of the possible Typology Number listings under the appropriate Category data section in the Subject Data Base.

For example, if each listing under the particular Category data section has three fields, e.g., as in the illustrated Subject Data Base 1, then the multiple-query formula would include three replications, with the first Typology Number 10, the second Typology Number 14, and the third Typology Number listed in the formula by field name or field number according the design of the data base applications program in which the Data Storage and Retrieval System has been implemented. This assures that the search covers all listings in which the topic may have been identified.

Note that the subject query routines are constructed on the basis of both the Typology Number 44 and End-of-Range Number 45 selected from the record in the Composite Catalog Data Base, and are used to search the Subject Data Base records on just the Typology Numbers (10, 14, 18, etc.) listed under the appropriate Category data section.

More complex queries can be developed to take into account inclusion or exclusion of subjects on the basis of a specified Skill Level 12, Interest/Willingness 9 to consult, departmental affiliation, facility with a particular foreign language, or any other data, the inclusion of which has been provided for in the design of the Subject Data Base.

To inaugurate the Search and Retrieval process with a particular Subject Data Base, the Subject Query Formulas formulated during the Identification process are received. The parameters for the Subject Query Routine are determined. The Subject Query Routine is constructed, and the search of the Subject Data Base is conducted. If desired, a verification of interest check with the subject is made. The process is concluded by reporting the results of the search of the Subject Data Base to the user.

To protect the privacy of the individuals cataloged in the Subject Data Base, the Data Storage and Retrieval System is designed in such a manner that the search of the Subject Data Base can be conducted under secure conditions by the "access" or "gateway" person. By imposing a verification of interest check with the identified subject before the results of the search are reported to the user, each identified subject can retain personal control over the disclosure of their information.

Based on the results of the search, the "access" "gateway" person can contact the subjects identified in the search and ascertain their willingness to have information about them disclosed to the user. Upon receipt of an affirmative response on the part of the subject, the "access" or "gateway" person will then provide the subject with the name, address, and telephone number of the user, and will contact the user and provide the user with the name, address, and telephone number of the subject.

This will complete the Search and Retrieval process, witch the anticipated result that the user is put in direct contact with a subject identified from the Subject Data Base that will be an appropriate and willing consultant.

Figure 12:
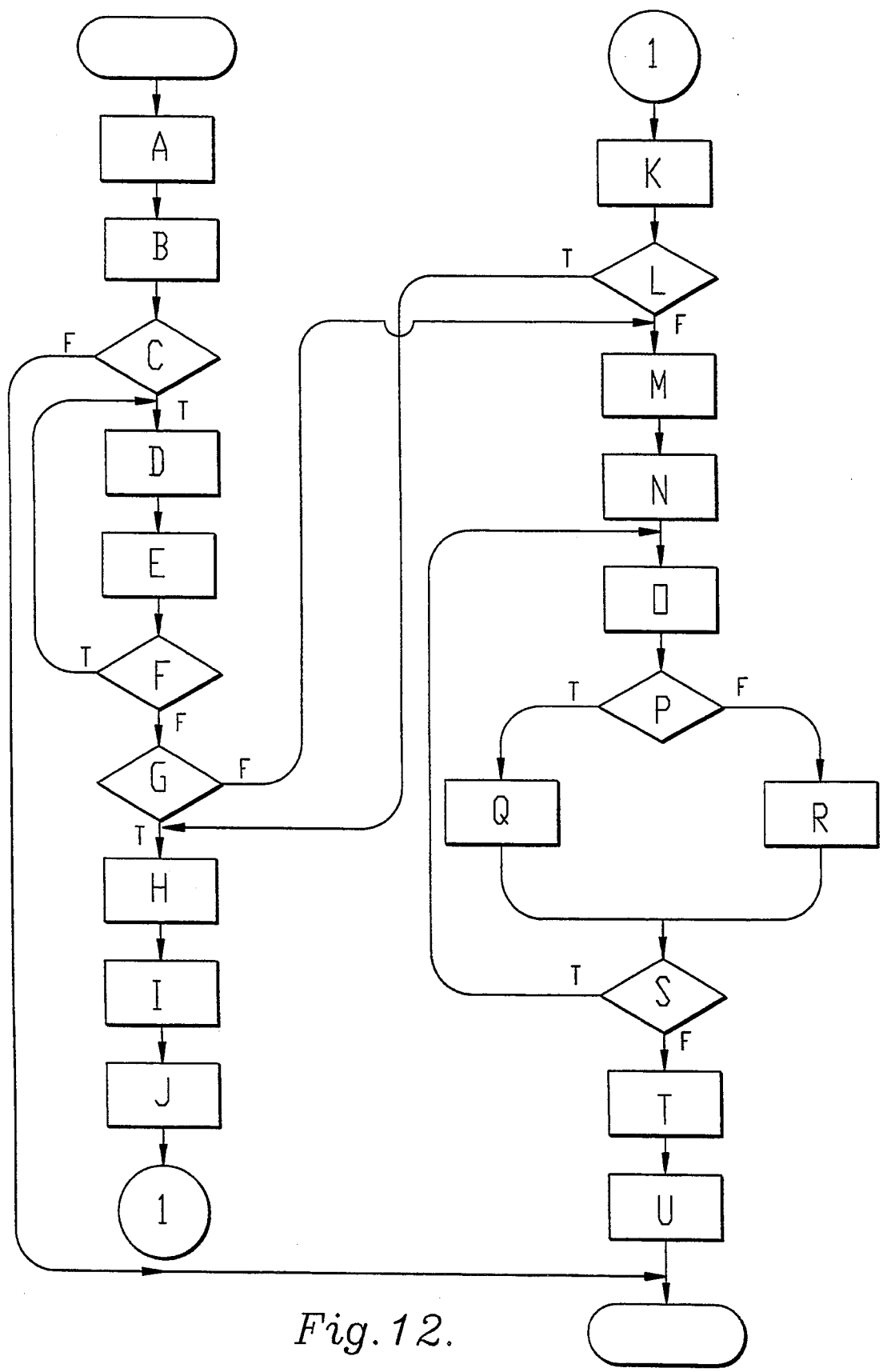
FIG. 12 is a flow chart illustrating the Search and Retrieval process according to the present invention.

As illustrated in FIG. 12, there are twenty-one steps involved in the Search and Retrieval process, steps involved in searching each appropriate Subject Data Base to identify qualified subjects and to obtain information concerning those individuals.

Step A in the Search and Retrieval process is to receive Subject Query Formulas and collated information formulated during Step J in the Identification process, described above.

Step B is to search the Subject Data Base to test the assumption that at least one Subject record exists that has at least one Typology Number 10, 14, 18, etc., under the appropriate Category data section that matches or is subsumed under one or more of the Typology Numbers 44 from the Composite Catalog Data Base records included in the Subject Query Formulas. Step C is then to determine if the match sought in Step B is found. If "True", the process advances to Step D. If "False", the Search and Retrieval process in that particular Subject Data Base is terminated.

Step D in the Search and Retrieval process is to establish the scope of the Subject Query Routine by designating the Category data sections to be searched.

Step E is to establish the number of replications to be made in the Subject Query Routine for the Category data section by counting the number of possible topic listings provided for under the Category data section in question.

Step F in the Search and Retrieval process is to determine if there are listings under another Category data section to be searched. If "True", the process advances to Step D, and if "False", to Step G where it is determined if inclusion or exclusion of subjects on the basis of a specified Skill Level 12, Interest/Willingness 9 to consult, departmental affiliation, facility with a particular language, or any other criteria included in the Subject Data Base is desirable. If Step G is "True", the process advances to Step H, and if "False", to Step M.

Step H in the Search and Retrieval process is to select the criterion field, i.e., Interest/Willingness 9, Skill Level 12, etc., and Step I is to establish the inclusion/exclusion parameters for the selected criterion.

Step J in the Search and Retrieval process is to create a Criterion Formula expressing tile inclusion/exclusion parameters, and Step K is then to incorporate the Criterion Formula into the Subject Query Routine.

Step L in the Search and Retrieval process is to determine if there is another criterion to be considered. If this is "True", the process advances to Step H. If "False", the process advances to Step M, where the completed Subject Query Routine is used to search the Subject Data Base.

Step N in the Search and Retrieval process is to prepare a Preliminary Report listing the subjects in the Subject Data Base that are identified in tile search.

Step O is to contact a subject identified by the search of the Subject Data Base and obtain permission to reveal personal information to the user.

Step P in the Search and Retrieval process is to determine if permission has been denied. If this is "True", the process advances to Step Q, where the name of the subject is deleted from the Preliminary Report. If the test in Step P is "False", the process advances to Step R where information concerning the user is provided to the subject.

Step S in the Search and Retrieval process is to determine if there is another subject identified in the search. If this is "True", the process advances to Step O. If "False", the process advances to Step T, where a Final Report is compiled from all of the names remaining on the Preliminary Report.

Step U in the Search and Retrieval process is then to transmit the Final Report to the user.

6. The System Maintenance Process

The final process to be discussed is the System Maintenance process, which involves various aspects of updating and deleting information in fields and records in the Data Storage and Retrieval System.

The System Maintenance process usually focuses on updating the data in the Subject Data Base records. On a periodic basis (typically once each year), it may be desirable to print out each record in the Subject Data Base in its entirety and send the printed copy to the individual subject whose information is included in the Subject Data Base. This will enable the subject listed in the Subject Data Base to review the information, make any necessary changes, additions, corrections, or deletions, and return the information to the system manager maintaining that particular Subject Data Base.

If topics are added under a specific Category data section in the Subject Data Base, the subject need only provide the new Descriptor Phrases 11 and the self-reported Skill Levels 12. These types of changes will trigger the implementation of the Cataloging process, which will effect changes in the updated record and prompt the necessary changes in the Composite Catalog Data Base. Whether the required changes are prompted by an annual update procedure or by a request of an individual listed in the Subject Data Base, the process is the same.

Figure 13:
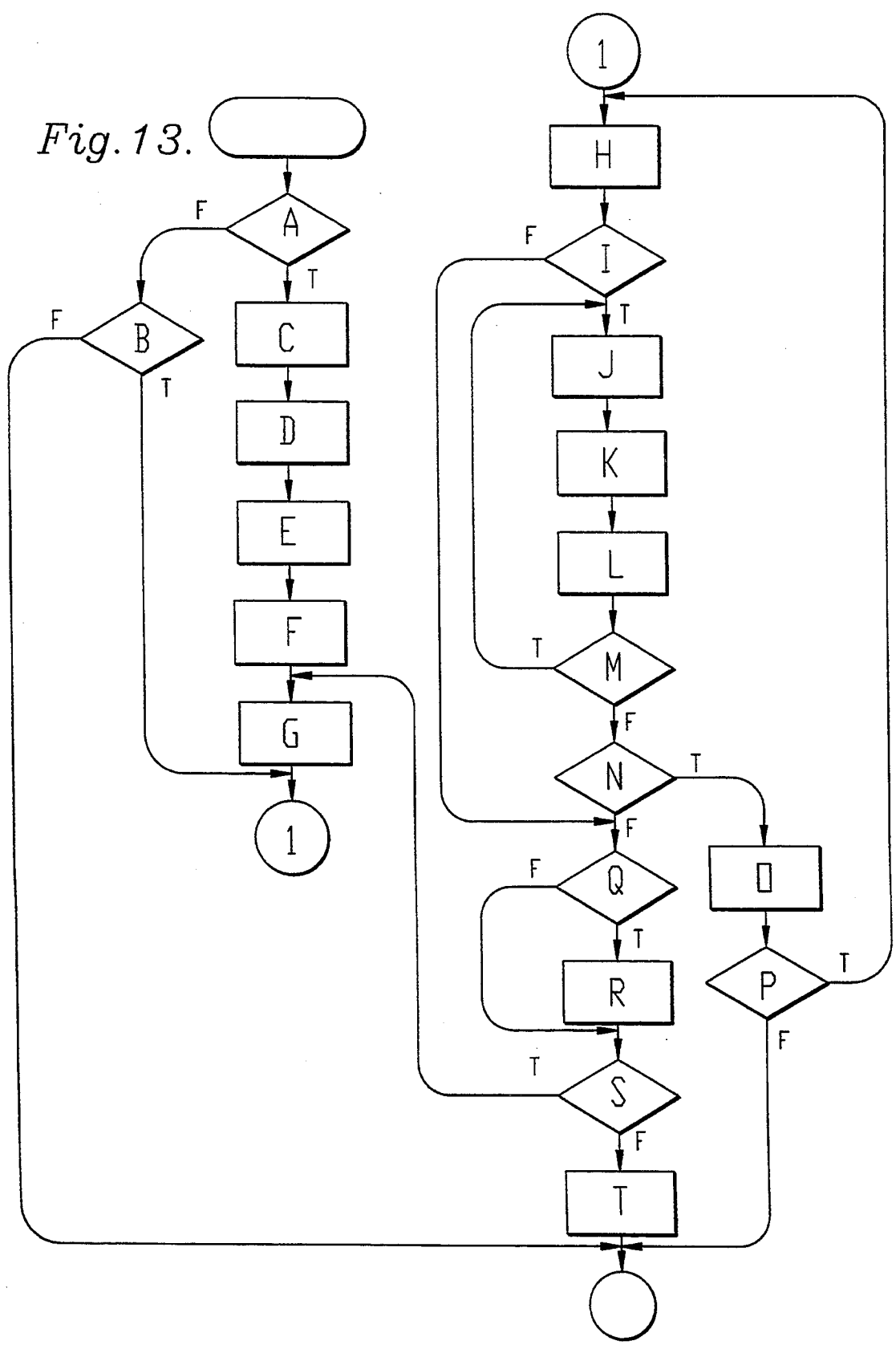
FIG. 13 is a flow chart illustrating the System Maintenance process according to the present invention.

As illustrated in FIG. 13, there are twenty steps involved in the System Maintenance process for updating records in the Subject Data Base.

The deletion of an entire record from the Subject data base can be handled by going directly to Step H in FIG. 13. Deletion of a Subject Data Base record will prompt the deletion of at least one and usually more records from the Composite Catalog Data Base.

Step A in the System Maintenance process is to determine if it is time to conduct routine System Maintenance. If this is "True", the process advances to Step C, and if "False", to Step B.

Step B in the System Maintenance process is to determine if there is data to be updated to a subject record or if there is a subject record to be entirely deleted from the Subject Data Base. If this is "True", the process advances to Step H, and if "False", the System Maintenance process is terminated.

Step C in the System Maintenance process is to print out the contents of the records contained in the Subject Data Base, and Step D is to then distribute the printed copies of the records from the Subject Data Base to each specific individual.

Step E in the System Maintenance process is for each subject to make any necessary changes, additions, corrections, and/or deletions to the information on the printed copy. Additions to listings under a Category data section need only include the new Descriptor Phrase 11 and the new Skill Level data 12. Step F is for each subject to return the printed copy of the record with the appropriate corrections to the system manager.

Step G in the System Maintenance process is for the system manager to select a subject record for updating, and Step H is for the system massager to Update all fields in the subject record other than those fields listed under the Category data sections in the Subject Data Base, based on the changes made by the subject on the printed copy.

Step I in the System Maintenance process is to determine if there have been any deletions to listings under a Category data section. If this is "True", the process advances to Step J, and if "False", to Step Q.

step J in the System Maintenance process is to find a match between the listing in the Subject Data Base record and the corresponding record in the Composite Catalog Data Base, based on the Typology Number, 10–44 the Record Counter symbol 13–51, and the Identification Symbol 24–52.

Step K in the System Maintenance process is to delete the listing under the Category data section in the Subject Data Base record, and Step L is to delete the corresponding entire record in the Composite Catalog Data Base.

Step M in the System Maintenance process is to determine if there is another deletion of a listing under any Category data section. If this is "True", the process advances to Step J, and if "False", to Step N where it is determined if this is a subject record that is to be completely deleted from the Subject Data Base. If Step N is "True", the process advances to Step O, and if "False", to Step Q.

Step O in the System Maintenance process is to completely delete the record from the Subject Data Base.

Step P in the System Maintenance process is to determine if there is another record to be dealt with. If this is "True", the process returns to Step H. If "False", the System Maintenance process is terminated.

Step Q in the System Maintenance process is to determine if there have been any additions to listings under a Category data section. If this is "True", the process advances to Step R, and if "False", to Step S.

Step R in the System Maintenance process is to initiate the Cataloging process for this Subject Data Base records as described above.

Step S in the System Maintenance process is to determine if there is another record to be dealt with. If this is "True", the process returns to Step G. If "False", the process advances to Step T.

Step T in the System Maintenance process is to update the sorting routines and key files that facilitate sorting and viewing the Composite Catalog Data Base numerically, alphabetically, and hierarchically. This is the last step in the System Maintenance process.

While the invention is susceptible to various modifications and alternative forms, a specific embodiment thereof has been shown by way of example in the drawings and has been described herein in detail. It should be understood, however, that it is not intended to limit the invention to the particular form disclosed, but on the contrary, the intention is to cover all modifications, equivalents, and alternatives falling within the spirit and scope of the invention as defined by the appended claims.

Additional Detailed Description

Figure 14:
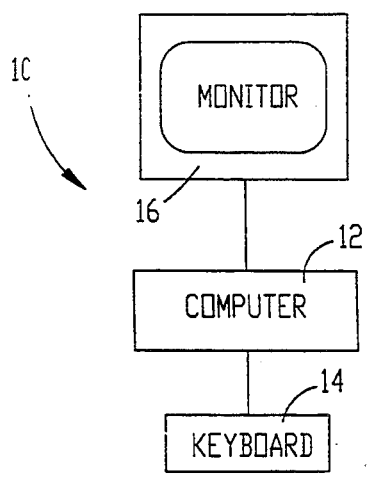
FIG. 14 is a schematic illustration of the preferred computer system for use in connection with the present invention.

FIG. 14 is a schematic diagram illustrating the preferred personal computer system as discussed above for implementing the present invention. More particularly, the preferred computer system 10 includes a Gateway 2000 50 MHZ 486DX2 EISA IBM Compatible Personal Computer 12 with a 340 MByte hard drive and floppy drives having keyboard 14 and monitor 16 (14 inch color VGA).

FIGS. 15A–18C are high level, computer program flow charts illustrating portions of the computer program set forth in source code in the microfiche appendix incorporated as part hereof. The preferred program is written in Smart Project Development Language using SmartWare II modularly integrated applications program available from Informix Software of Lenexa, Kansas with the program running under the Smart Database component of SmartWare II.

Figure 15B:
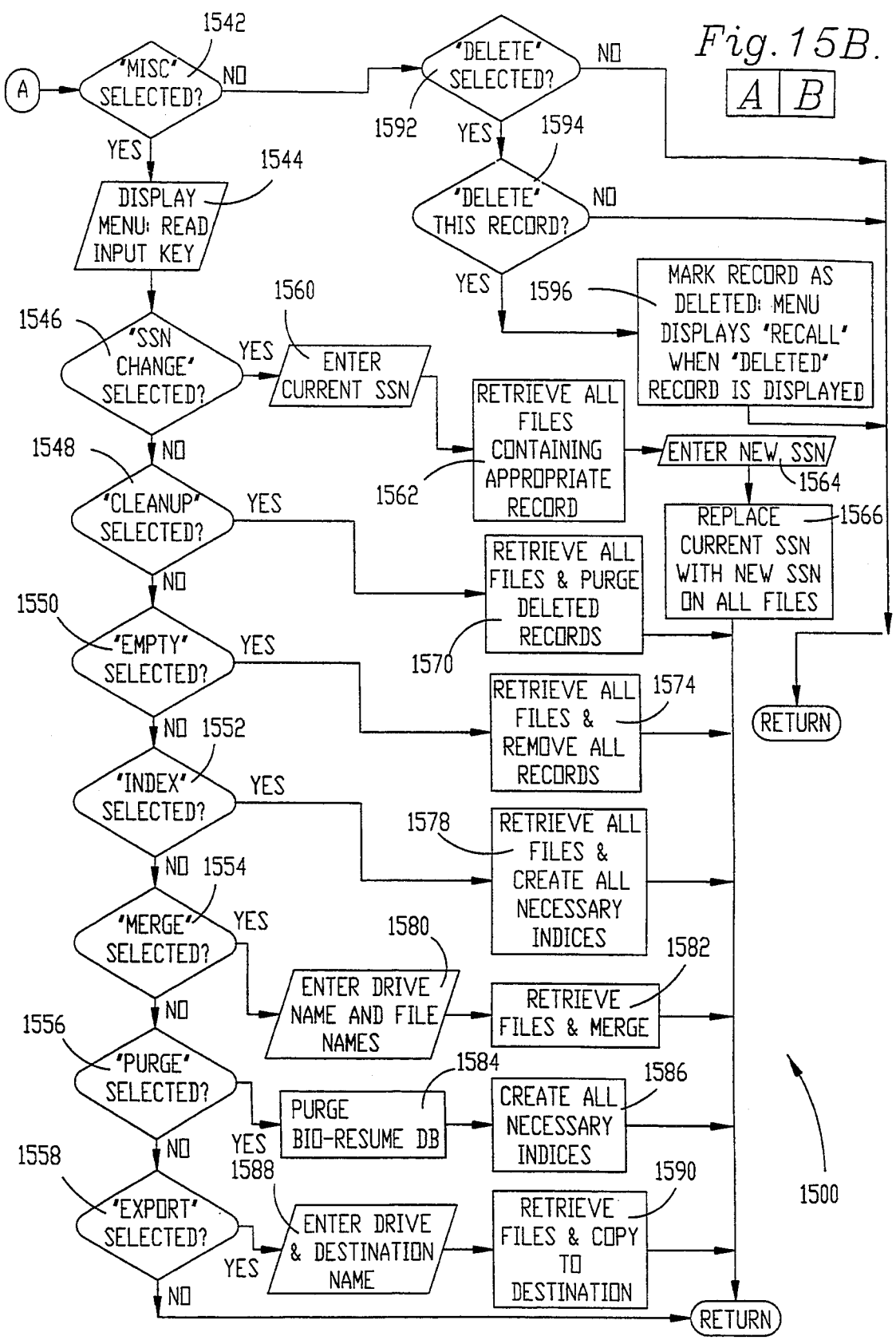
FIG. 15B is a computer program flow chart illustrating the remaining portion of the ENTRY program module.

FIGS. 15A–B further illustrates ENTRY module 1500 also discussed in connection with FIG. 8, which is used to create the Subject Database. Module 1500 enters at step 1502 which displays the main menu on monitor 16 and reads input selections entered by way of keyboard 14.

The program then moves to step 1504 which asks whether the function "add" was entered, used when the user wishes to create a new record. If yes, the identification number (ID) of the new subject is entered by way of keyboard 14 in step 1506. As discussed above, the preferred ID number is the subject's Social Security Number. Step 1508 then checks whether this ID number already exists, indicating that a record with this ID number has already been created. If yes, step 1510 displays the legend "record already exists" on monitor 16 and the program loops back to step 1502. If the answer in step 1508 is no, the new record is created, data is entered and edited in step 1512, and then the program returns to step 1502.

If the answer in step 1504 is no, step 1514 asks whether the input "find" was entered, used to find an existing record. If "find" was selected as indicated by a yes answer in step 1514, an ID number is entered in step 1516 after which step 1517a asks whether an ID number was entered. If yes, step 1517b retrieves the corresponding input value. If the ID number was not entered, a name is entered in step 1517c whereupon step 1517d asks whether a name was entered. If yes, step 1517b retrieves the corresponding value. After step 1517b, step 1518 asks whether the record was found. If the answer in step 1518 is no, step 1522 displays the legend "record not found" on monitor 16, after which the program returns to step 1502. If the answer in step 1518 is yes, step 1520 retrieves and displays the correct record. The program then returns to step 1502.

If the answer in step 1514 is no, step 1524 asks whether the input "update" was entered, which is used to update an existing record. If the answer is yes to step 1524, step 1526 advances to the selected page in the displayed record. Step 1527 then retrieves the edit process subroutine included as part of the preferred database program.

Step 1528 permits the user to enter and/or edit data to the record. In entering phrases which are descriptive of various interest, skills, and abilities of the subjects, "natural language" may be used in entering the various descriptor phrases which will be subsequently cataloged by Typology Number. In this way, artificial constraints are not imposed upon the subject in order to develop descriptions of topics of interest. But rather, the subject can describe the interest using his or her own wording to best describe that interest. This facilitates the data entry process and fosters the highest level of descriptiveness and accuracy because the subjects themselves are the most knowledgeable in the proper wording in their area of interest.

Step 1529 asks whether the "exit" key has been activated on keyboard 14. If no, step 1530 advances to the next page. When the editing process is complete, the exit key is activated, the answer in step 1530 is yes, and the program returns to step 1502.

If the answer in step 1524 is no, step 1532 asks whether the input "quick" was entered. If yes, step 1534 displays a list of subject database selections to facilitate the retrieval of a particular page. Step 1538 then asks whether the "enter" key has been entered. If yes, in step 1540, the program looks up and retrieves the selected page. If no, step 1539 asks if the exit key has been activated; if no, the program loops back to step 1538 and when yes, the program returns to step 1502.

If the answer is step 1532 is no, step 1542 (FIG. 15B) asks whether the miscellaneous selection has been entered and, if yes, step 1544 displays the menu selections for "miscellaneous" and reads keyboard 14 for entry. The program then moves through decision steps 1546–1558 as indicated in FIG. 15B to determine which of the menu items was selected.

If yes in step 1546, indicating a change must be made in the ID number, the current ID number is entered in step 1560. This is used when the current ID number or Social Security Number was entered in error, for example. Step 1562 then retrieves all files containing the appropriate record identified by the current ID number. Next, the new ID number is entered in step 1564 and step 1566 then replaces the current ID number with the new ID number in connection with the record in all of the retrieved files. It will be noted that the record data is stored in a distributed subject database with each individual component identified and thereby retrievable by the ID number, preferably the Social Security Number. The program then returns to step 1502.

If "cleanup" was selected in step 1548, step 1570 retrieves all files and purges all records marked for deletion. If "empty" was selected in step 1550, step 1574 retrieves all files and removes all records.

If "index" was selected in step 1552, step 1578 retrieves all files and creates all necessary indices. If "merge" was selected in step 1554, the drive name and file names of the files to be merged are entered in step 1580. Step 1582 then retrieves the identified files and merges them.

If "purge" was selected in step 1556, step 1584 purges the bio-resume database, of all records marked for deletion and step 1586 then creates all necessary indices. If "export" was selected in step 1558, the drive and destination names are entered in step 1588. Step 1590 then retrieves the named file and copies it to the indicated destination. If none of the indicated selections are entered, or after the completion of each set of tasks, the program returns to step 1502.

If the answer in step 1542 was no, step 1592 asks whether "delete" was selected. If yes, step 1594 then prompts the user to indicate whether the current record should be deleted. If a yes was entered, step 1596 then marks the record as deleted, and displays "recall" on the menu line when the deleted record is displayed. If the answers are no in steps 1592 or 1594, or after 1596, the program returns to step 1502.

Figure 16B:
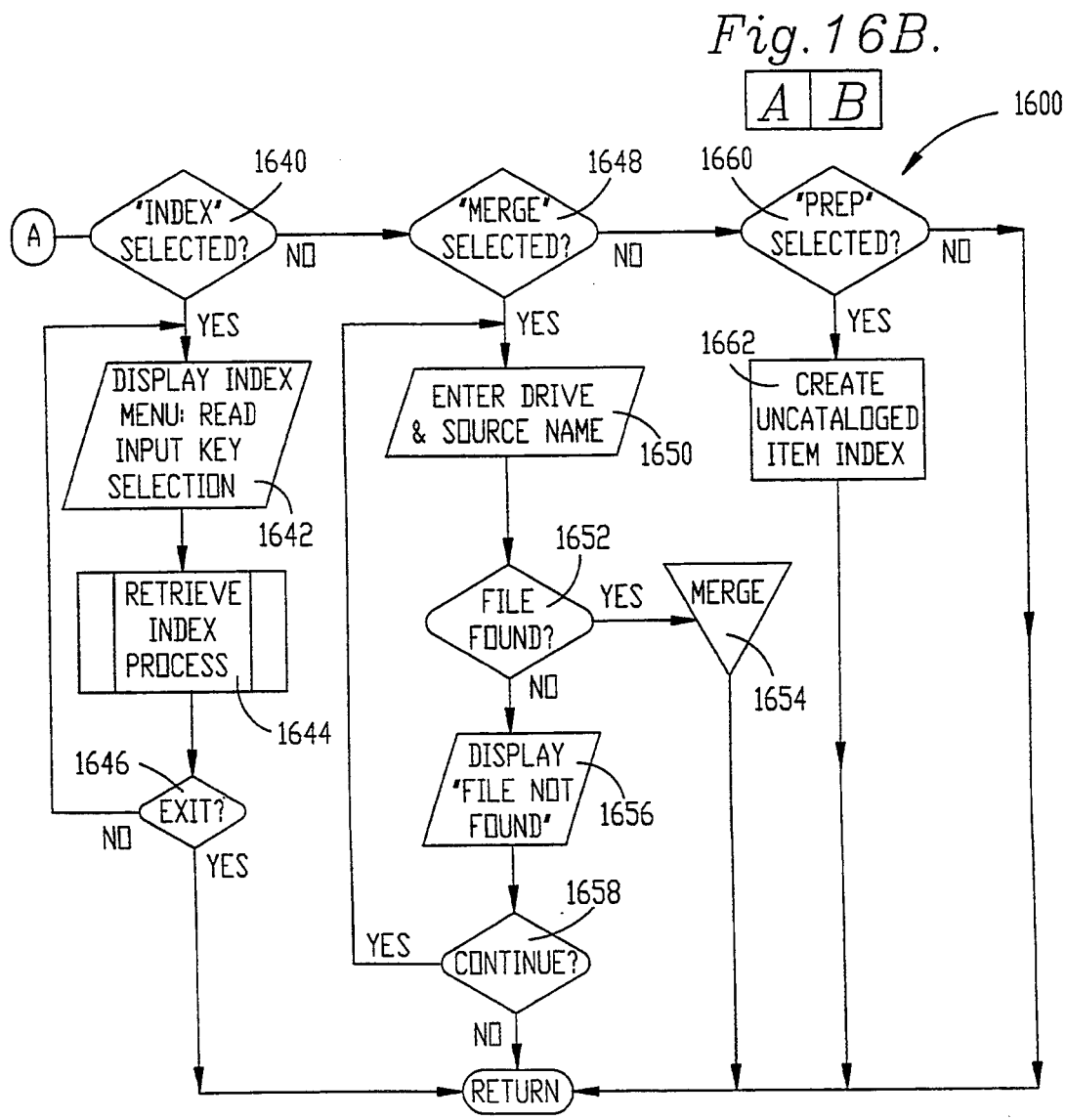
FIG. 16B is a computer program flow chart illustrating the remaining portion of the CATALOG program module.
Figure 16A:
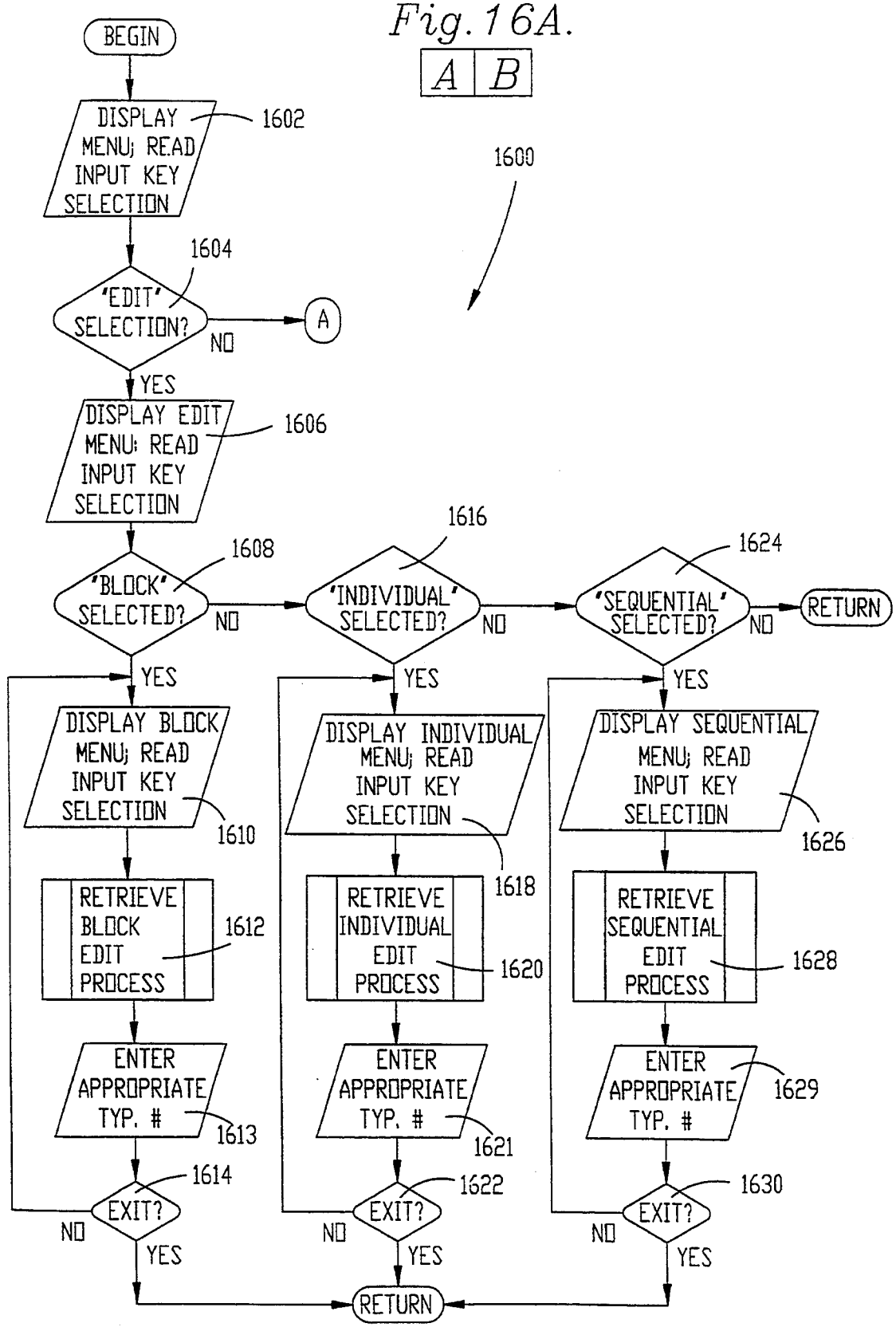
FIG. 16A is a computer program flow chart illustrating the first portion of the CATALOG program module.

FIGS. 16A-B further illustrate CATALOG module 1600 discussed above in connection with FIG. 9 for assigning typology numbers to the various descriptor phrases. More particularly, selected typology numbers are assigned to the various descriptor phrases in this module. As will be appreciated, two different descriptor phrases might deal with the same subject matter and therefore may be appropriately assigned the same Typology Number. It may also occur that a Typology Number assigned to a particular descriptor phrase is the same number assigned to a subheading which appears as a Basic Outline entry. In such an event, a "0.1" is automatically added to the descriptor phrase Typology Number to force it to be sorted at a lower level (see module 1700 discussed hereinbelow). Module 1600 enters at step 1602 which displays the various menu selections and reads the selected entry from keyboard 14. The possible entries include "edit", "index", "merge", and "prep."

If "edit" was selected in step 1604, step 1606 then displays the edit menu and reads the selected keyboard entry. The possible edit functions include "block", "individual", and "sequential."The block function allows assigning of typology numbers to a group of descriptor phrases. The individual function allows this assignment to a group of descriptor phrases representing a specific individual. The sequential function allows the assignment of typology numbers in a sequential manner. If "block" was selected as indicated by a yes answer in step 1608, step 1610 displays the block menu and reads the selected entry.

Step 1612 then retrieves the block editing subroutine. Within the block editing subroutine, the "lookup" function displays dropdown menus listing precataloged descriptor phrases from sheets used to prompt subject responses. If a specific precataloged descriptor phrase is identified and selected in step 1613, the program automatically enters the appropriate Typology Number previously incorporated in the Catalog program in association with that descriptor phrase.

Next, step 1614 asks whether the "exit" key has been activated. If no, the program loops back to step 1610 in order to select another block edit function.

If the answer in step 1608 is no, step 1616 asks whether "individual" was selected. If yes, step 1618 displays the corresponding menu and reads the input from keyboard 14. Step 1620 then retrieves the individual edit process. The appropriate Typology Number is then entered in step 1621 after which step 1622 asks whether exit is indicated. If no, the program loops back to step 1618 to continue the individual edit process. If the answer in step 1616 is no, step 1624 asks whether "sequential" was selected. If yes, step 1626 displays the corresponding menu and reads the input from keyboard 14.

Step 1628 then retrieves the sequential edit process. In the case of the Block (step 1612), Individual (1620), and Sequential (step 1628) Edit processes, the program automatically enters the lowest level (level 9) corresponding to the hierarchical classification scheme in the "level sort" field. The program also creates an entry for the "alpha sort" field by deleting all capitalization and prepositions from the entered descriptor phrase.

Next, the appropriate Typology Number is entered in step 1629 after which step 1630 asks whether exit is indicated. If no, the program loops back to step 1626 to continue the sequential edit process. If yes is indicated in any of steps 1614, 1622, 1630 or 1638, the program returns to step 1602.

If the answer in step 1604 is no, indicating that the edit process was not selected, the program moves to step 1640 (FIG. 16B) which asks whether "index" was selected. If yes, step 1642 displays the corresponding menu and reads the input from keyboard 14. Step 1644 then retrieves the index process after which step 1646 asks whether exit is indicated. If no, the program loops back to step 1642.

If the answer in step 1640 is no, step 1648 asks whether "merge" was selected. If yes, the drive and source name of the file to be merged is entered in step 1650. Step 1652 then asks whether the indicated files were found. If yes, these files are merged in step 1654. If the answer in step 1652 is no, step 1656 displays the legend "file not found" on monitor 16 after which step 1658 asks whether the merge process should continue. If yes, the program loops back to step 1650.

If the answer in step 1648 is no, step 1660 asks whether "prep" was selected. If yes, step 1662 creates an index of uncataloged items. After steps 1646, 1654, 1658, 1662 or if the answer is no in step 1660, the program returns to step 1602.

Figure 17A:
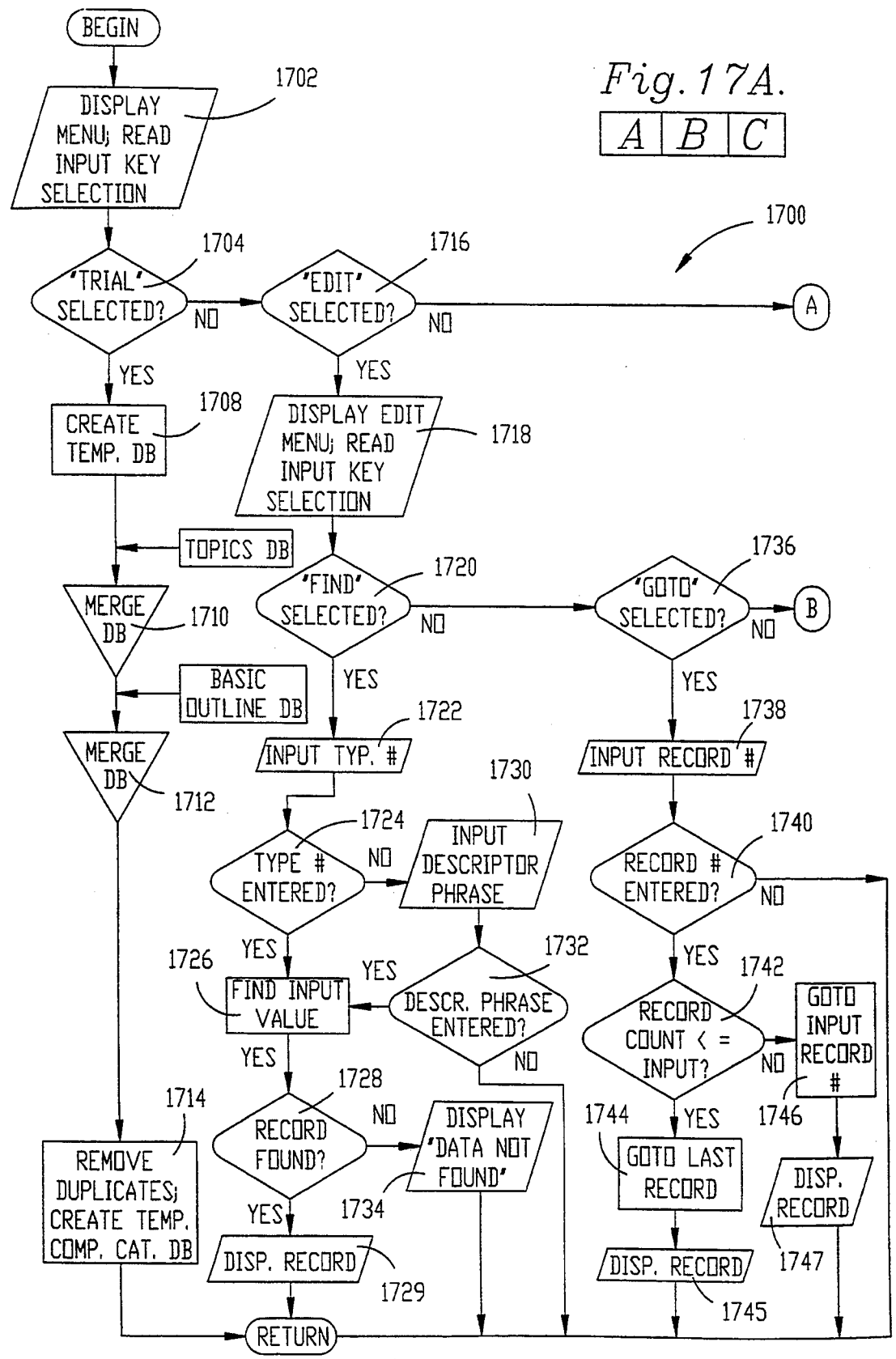
FIG. 17A is a computer program flow chart illustrating the first portion of the BUILD program module.
Figure 17B:
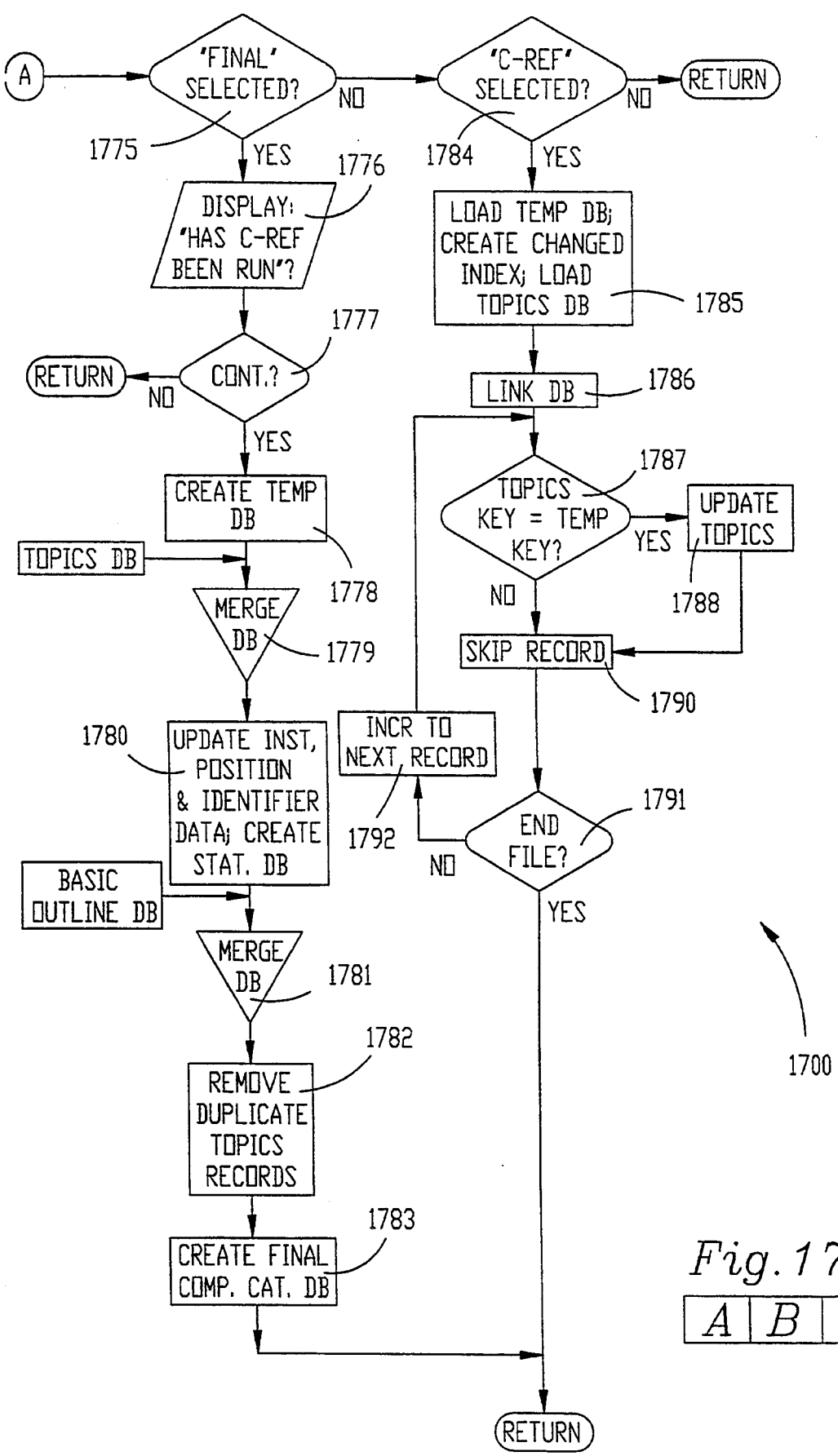
FIG. 17B is a computer program flow chart illustrating the a second portion of the BUILD program module.
Figure 17C:
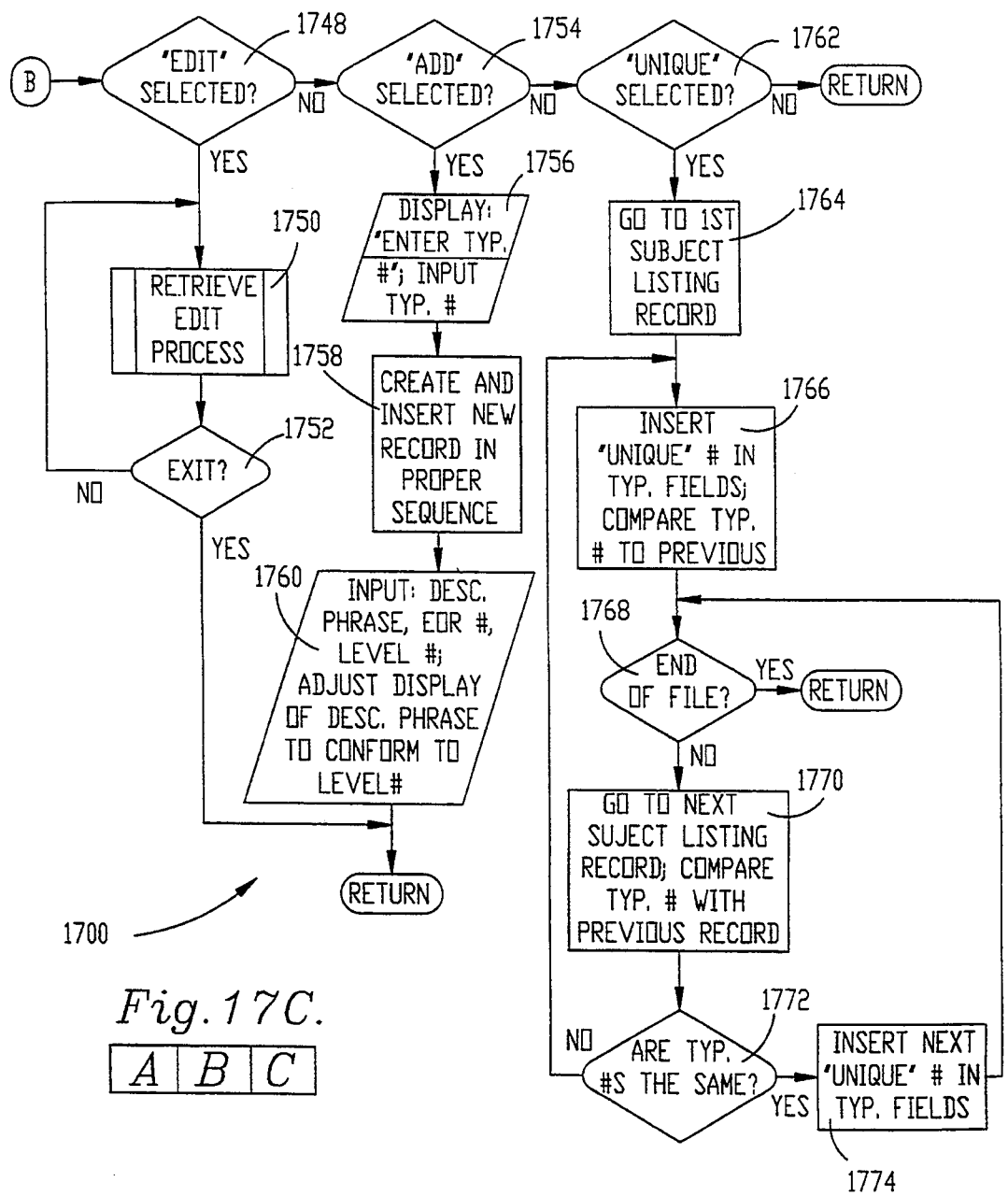
FIG. 17C is a computer program flow chart illustrating the remaining portion of the BUILD program module.
Figure 18A:
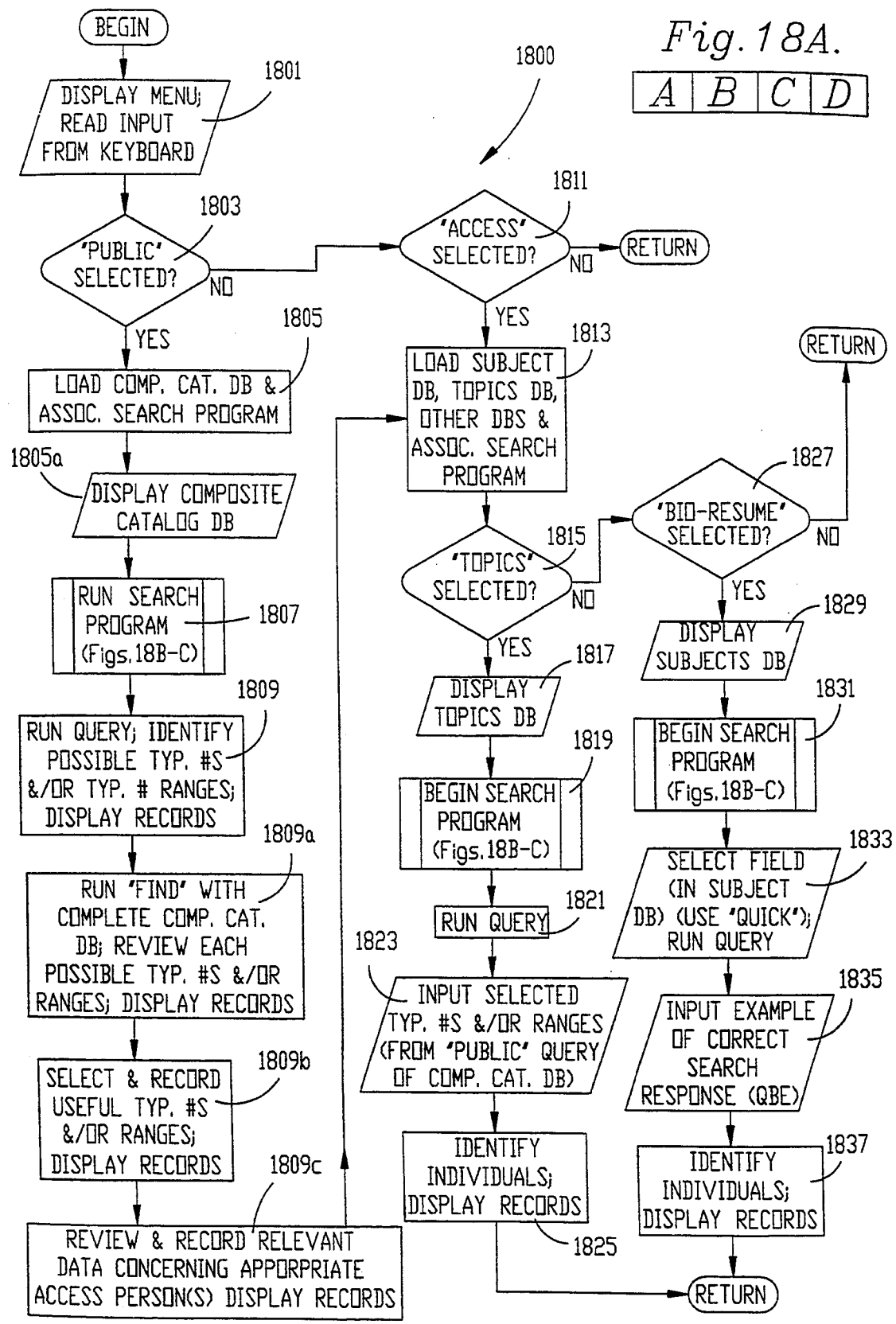
FIG. 18A is a computer program flow chart illustrating the first portion of the PUBLIC ACCESS program module.
Figure 18B:
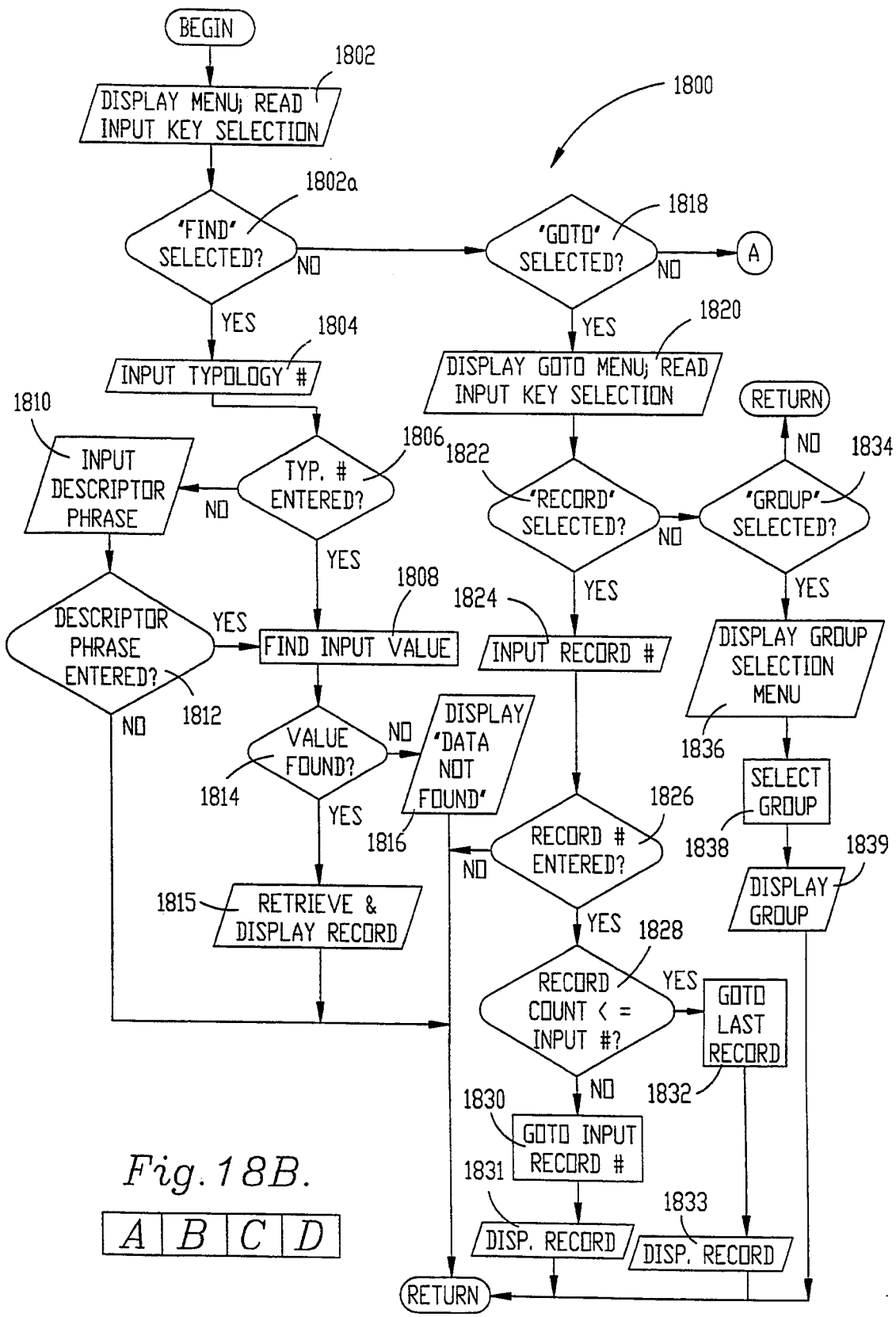
FIG. 18B is a computer program flow chart illustrating the a second portion of the PUBLIC ACCESS program module.
Figure 18C:
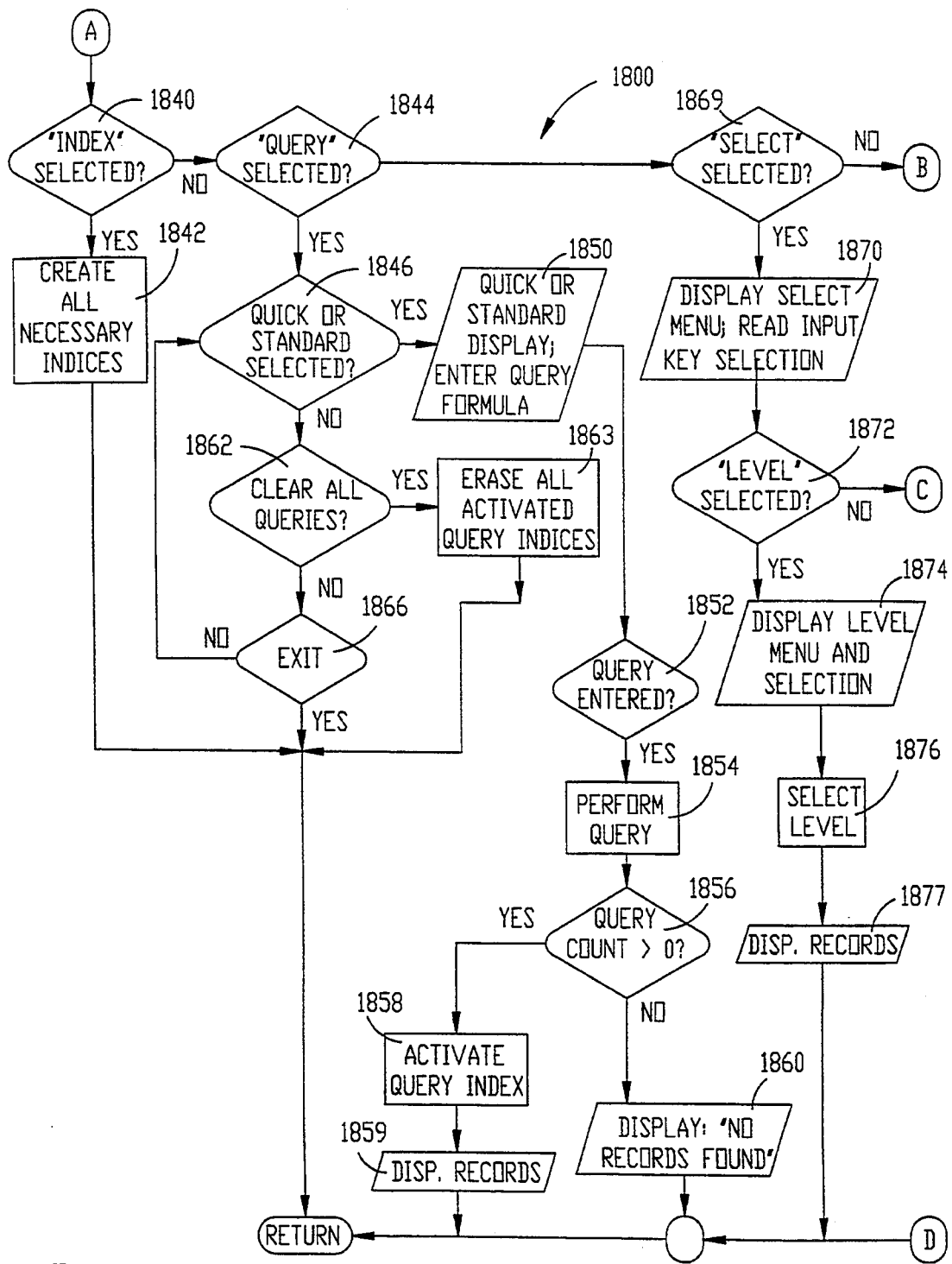
FIG. 18C is a computer program flow chart illustrating the remaining portion of the PUBLIC ACCESS program module.
Figure 18D:
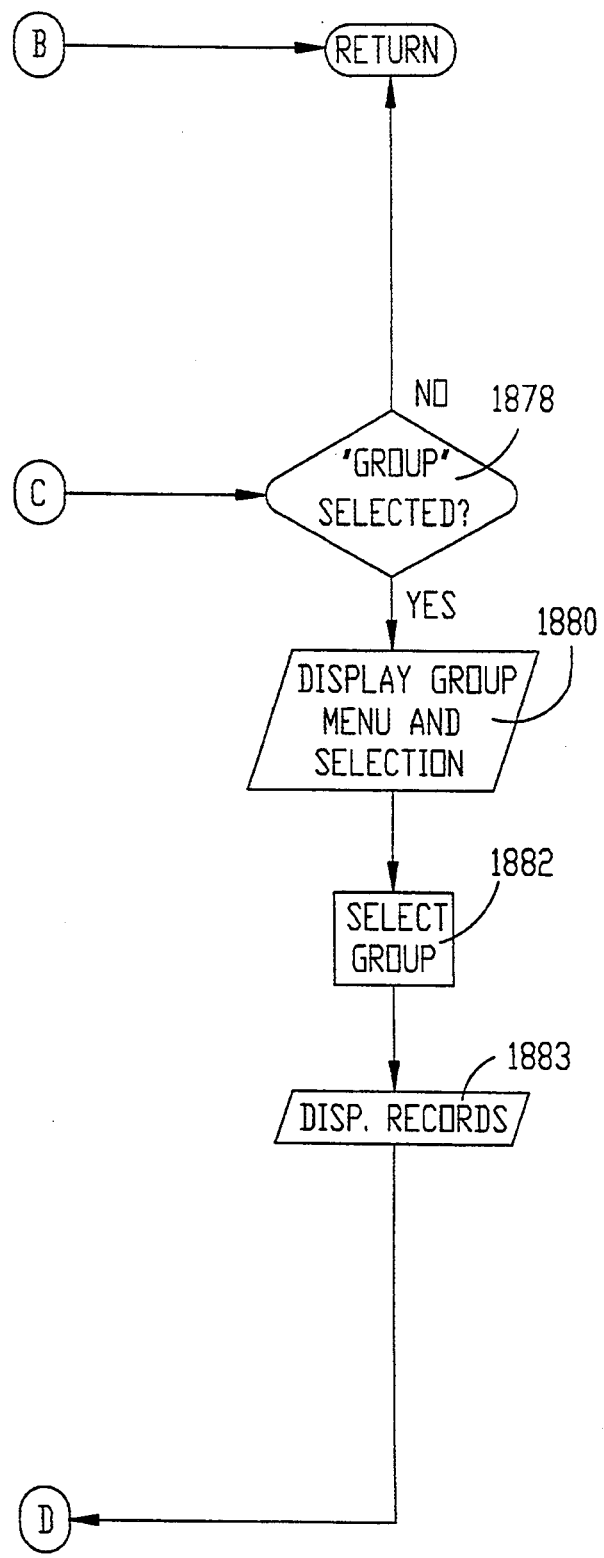

FIGS. 17A-C illustrate BUILD module 1700 which is used to create the Composite Catalog Database discussed above in connection with FIG. 7. More particularly, module 1700 merges the descriptor phrases which have been cataloged with the assigned typology numbers from the Topics Database with all of the records from the Basic Outline Database to create the Composite Catalog Database. In general, the descriptor phrases are stored in association with a typology heading having a range of typology numbers encompassing the typology numbers assigned to the descriptor phrases. The initial merge takes place in a temporary database for editing purposes and when finalized, the Composite Catalog Database is created as a separable database that can be stored and used on computer systems separate and apart from the computer system on which the Subject Database resides. As discussed above, this preserves the individual identity of the subjects and allows the Composite Catalog Database to be sent to others for searching as illustrated in FIGS. 18A-C.

The Typology Database includes a large number of available topics which may be used by the cataloger to catalog a particular descriptor phrase. Typically, all of the available topics and associated numbers will not be used for cataloging a given set of descriptor phrases because the number of available topics is greater than the range of the descriptor phrases to be cataloged. The appropriate descriptor phrases, together with the associated Typology Numbers and End-of-Range Numbers, make up the Basic Outline entries which are included in the Basic Outline Database.

BUILD module enters at step 1702 which displays on monitor 16 a menu of selections including "trial", "edit", "final" and "CREF."This step also reads the user selection entered on keyboard 14.

Step 1704 then asks whether "trial" was selected. If yes, step 1708 creates an empty temporary database. Next, step 1710 merges data from the Topics Database into the temporary database.

The next steps in the program use the Basic Outline Database in creating the Composite Catalog Database. The records in the Basic Outline Database constitute the hierarchical classification scheme upon which this system is based. This hierarchical classification scheme is an adaptation of the Library of Congress Classification Schedule, which is the organizing basis for the Library of Congress System. Each record in the Basic Outline consists of five fields: (1) descriptor phrase, (2) Typology Number, (3) End-of-Range Number, (4) level sort number, and (5) alpha sort phrase.

The visual display of the descriptor phrase on the monitor 16 uses capitalization and indentation to indicate the hierarchical level of the listing. This indentation is governed by the number inserted in the level field, with the lower levels being indicated by the higher numbers and greater indentation, with the lowest level being level 9, and being reserved for descriptor phrases from subject listings. The level sort field number also is utilized by the program to selectively display the hierarchical classification scheme at various levels of detail. ("Level sort" discussed further hereinbelow). The alpha sort phrase contained in the alpha sort field permits accurate alphabetical sorting of the descriptor phrases disregarding the possible influences of capitalization and/or indentation.

In creating the Composite Catalog, the Basic Outline entries which form the structure for the Composite Catalog preferably exhibit three characteristics. First, the Basic Outline entries at the same level are mutually exclusive. Second, a Basic Outline entry at one level subsumes all associated subheadings at lower levels. Third, the range represented by the Typology Number and associated End-of-Range Number incorporates all Typology Numbers associated with Topics Database descriptor phrases cataloged under that particular Basic Outline entry.

Returning now to the program description, step 1712 then merges the Basic Outline Database into the temporary database creating a "trial" composite catalog. In other words, steps 1706-1712 combine, in a temporary database, topics data and the Basic Outline data into a temporary composite catalog.

As can be appreciated, the catalog and topics data may include items that have been previously handled. Because of this, recombination creates duplicates of those items that have already been processed in a previous session, for example. Step 1714 identifies duplicate items and deletes each duplicate. The net effect is to add new catalog items to the temporary composite catalog. These new catalog items are not marked as having been previously processed and thus can be identified. The program then returns to step 1702.

If the answer in step 1704 is no, step 1716 then asks whether "edit" was selected. If yes, step 1718 displays the edit menu that includes the selections of "find," "goto," "edit," "add," and "unique," and reads these input selections from keyboard 14.

If "find" was selected in step 1720 in order to find a particular record, a typology number was entered in step 1722 and step 1724 then asks whether this typology number was entered. If yes, step 1726 finds the associated input value. Step 1728 then checks whether this record was found. If yes, step 1729 displays the record after which the program returns to step 1702.

If the answer in step 1724 is no, indicating that the typology number has not been entered, the user is prompted to enter the descriptor phrase in step 1730. Step 1732 then checks whether this descriptor phrase was entered. If yes, step 1726 finds the associated input value. Step 1728 then checks whether this record was found. If yes, step 1729 displays the record after which the program returns to step 1702. If no, the program returns to step 1702.

If the answer in step 1728 is no, indicating that the value was not found, step 1734 displays the legend "data not found" on monitor 16, whereupon the program returns to step 1702.

If the answer in step 1720 is no, step 1736 asks whether "goto" was selected for retrieving a specific record by record number. If yes, the record number is entered in step 1738 whereupon step 1740 asks whether a record number was entered. If yes, step 1742 asks whether the total number of records is less than or equal to the entered record number. If yes, the last record in the set is retrieved in step 1744 and displayed in step 1745. If the answer in step 1742 is no, step 1746 retrieves the record identified by the record number and 1747 displays the record. If the answers in steps 1736 or 1740 are no, or after steps 1745 or 1747, the program returns to step 1702.

If the answer in step 1736 is no, step 1748 (FIG. 17C) asks whether "edit" was selected to edit the displayed (highlighted) record. If yes, step 1750 retrieves the edit process to permit editing a specific record.

Within the edit process, the "range" command searches the Typology Numbers associated with the Subject Listing descriptor phrases (level 9) and marks all records for which the Typology Numbers fall outside the Typology Number Range of the immediately preceding Basic Outline entry, thus enabling the cataloger to either add a Basic Outline entry or extend the Typology Number Range.

Then step 1752 asks whether "exit" is indicated. If no, the program loops back to step 1750 to continue the edit process; if yes, the program returns to step 1702.

If the answer in 1748 is no, step 1754 asks whether "add" was selected to add a new Basic Outline record to the temporary Composite Catalog Database.

If yes, step 1756 displays "Enter Typology #" and the new typology number is entered. In step 1758, the new record is created and inserted in the proper typology number sequence. In step 1760, the proper descriptor phrase, End-of-Range number, and the proper level number are entered; additionally, the indented display of the descriptor phrase is adjusted to properly conform to the level number. When this process is completed, the program returns to step 1702.

If the answer in step 1754 is no, then step 1762 asks whether "unique" was selected to transform all Typology Numbers associated with Descriptor Phrases representing subject interests called subject listings into unique Typology Numbers. If "unique" was selected in step 1762, then step 1764 goes to the first subject listing record, and step 1766 inserts a "unique" number such as "AO1" in Typology Number fields 20, 21, 22.

In step 1768, the program checks to see if the end-of-file marker has been reached. If so, the program exits to return. If not, the program executes step 1770 and goes to the next subject listing record. Also, step 1770 compares fields 1 through 19 of the current Typology Number for the subject listing record with fields 1-19 of the immediate preceding subject listing record.

If, in step 1772 the Typology Numbers are found to be identical, the program, in step 1774, inserts the next sequential unique number such as "AO2" (or "AO3," "AO4" etc.) in fields 20, 21, 22 of that Typology Number, and then returns to step 1768. If, in step 1772, the Typology Numbers are not found to be identical, then the program returns to and executes step 1766.

If a no answer in step 1716 indicates that "edit" was not selected, the program moves to step 1775 (FIG. 17B) which asks whether "final" was selected. This function is selected whenever the editing of the temporary composite catalog is complete. If the answer in step 1775 is yes, step 1776 displays the query: "Has CREF been run?" If not, a "no" is entered and the program returns to step 1702; if yes in step 1777, the program moves to step 1778.

Step 1778 creates an empty temporary database into which the Topics Database is merged in step 1779. Next, step 1780 updates the institutional, position and identifier data, and then creates a statistical database. Records from this statistical database are appended to appropriate records in the Topics Database. In other words, statistical data concerning frequency of occurrence in each category e.g., research, economic development and so forth, are appended to the corresponding category descriptor phrase in the Topics Database.

In addition, the institutional affiliation(s) of the subjects represented by each Topics Database descriptor phrase is noted. This permits the creation of multi-institutional Composite Catalogs containing information for subjects from several institutions. When selected, the "Access" command will identify all appropriate access persons to assist the user in finding the appropriate subject. The information concerning the access person(s) associated with the various categories and/or institutions is contained in the Identifier Database.

Step 1781 then merges the Basic Outline Database with the Topics Database. Next, step 1782 removes any duplicate records in the merged database. Finally, step 1783 creates the final Composite Catalog Database and the program returns to step 1702. In the Composite Catalog Database, the records which represent unique topics of interest no longer carry or have identification numbers which directly associate or link them to Subject Database records. This means that the Topics Database needs to be searched to establish a link to the Subjects Database. This ensures the preferred separation between the Subjects Database and the Composite Catalog in order to maintain the privacy of the individuals.

If the answer in step 1775 is no, step 1784 asks whether "CREF" was selected. If no, the program returns to step 1702. If yes, step 1785 retrieves the temporary database (see steps 1714, 1750), creates a changed index, and retrieves the Topics Database. Step 1786 then links the databases. Next, step 1787 asks whether the topics key is the same as the temporary key for identifying and retrieving the records. If yes, step 1788 updates those topics. If no in step 1790, or after step 1788, the record is skipped in step 1790. Step 1791 then asks whether this is the end of the file. If no, step 1792 increments to the next record after which the program loops back to step 1787. If the answer in step 1791 is yes, the program returns to step 1702.

FIGS. 18A-C illustrate PUBLIC ACCESS module 1800 further discussed above in connection with FIG. 12. This module is used to search the Composite Catalog after it is created and after creation of the other databases, to search the Topics Database, and to search the Subject Database.

Module 1800 enters at step 1801 which displays the menu from the preferred SMART program and reads the keyboard input. Step 1803 then asks whether "Public" was selected for searching the Composite Catalog Database. If yes, step 1805 loads this database and associated search program. Next, step 1805a displays the Composite Catalog Database, and step 1807 executes the search program (see FIGS. 18B-C). Step 1809 then runs the query, identifies possibly useful Typology Numbers and/or Typology Number ranges, and displays the corresponding records.

Next, in step 1809a, the "find" command is used in conjunction with the complete Composite Catalog Database to review, in turn, each possible Typology Number and/or Typology Number Range to determine the suitability of the topics to be chosen. It possible that a specific Typology Number will identify a cluster of topics better represented by the appropriate Basic Outline Heading and subsequently, the Typology Number Range associated with that Basic Outline entry is selected for use.

Then, in step 1809b, the most useful Typology Numbers and/or Typology Number Ranges are selected and recorded for subsequent use in querying the Topics Database in conjunction with the "Access" search program.

Finally, in step 1809c, using the "access" command, the relevant data concerning the appropriate access persons for each selected Typology Number(s) and/or Typology Number Range(s) is reviewed and recorded for identifying the appropriate access person to be contacted.

If "no" is indicated in step 1803, or after step 1809, step 1811 asks whether "Access" was entered for searching either the Topics Database and/or the Subject Database. It will be noted that normally a "public" user will only have access to the Composite Catalog Database. A designated "access" person then searches the Subject Database based on the results of the search of the Composite Catalog Database and reveals the names of the identified individuals only after receiving authorization. In this way, the privacy of the individuals listed in the Subject Database is preserved.

If the answer in step 1811 is yes, step 1813 loads the Subject and Topics Databases, other associated databases and the associated search program. Step 1815 then asks whether a "topics" search was selected. If yes, step 1817 displays the Topics Database and the search program illustrated in FIGS. 18B-C is executed. Step 1821 then runs the query.

In step 1823, the Typology Numbers and/or Typology Number Ranges are entered which were selected as a result of the "public" query of the Composite Catalog Database. Step 1825 then displays the records of the individuals from the Subject Database corresponding to these Typology Numbers and/or Typology Number Ranges after which the program returns to step 1801.

If the answer in step 1815 is no, step 1827 asks whether "bioresume" was selected. This selection is used when searching for individuals having particular abilities or interests such as the ability to speak French. If the answer in step 1827 is yes, step 1829 displays the Subjects Database and step 1831 then executes the search program illustrated in FIGS. 18B–C.

In step 1833, a field of search is selected (such as language abilities) in the Subject Database using the "quick" function, and the query is run. Then, in step 1835 an example of a correct search response is entered (query by example (QBE)) and step 1837 retrieves and displays the corresponding individual records from the Subject Database. The program then returns to step 1801 which also occurs upon a "no" answer to step 1811.

FIGS. 18B–C illustrate the search portion of module 1800, This portion is associated with the "Public" and "Access" programs illustrated in FIG. 18A. This portion enters at step 1802 (FIG. 18B) which displays the menu selections and reads the selection from keyboard 14. The available selections include "find", "goto", "index", "query" and "select." If "find" was selected as indicated by a yes answer in step 1802a, a typology number is entered in step 1804 after which step 1806 checks whether this number has been entered. If yes, step 1808 retrieves the corresponding input value. If no typology number is entered, a descriptor phrase is entered in step 1810, whereupon step 1812 asks whether this descriptor phrase has been entered. If yes, step 1808 retrieves the corresponding value. After step 1808, step 1814 asks whether the value was found. If yes, step 1815 retrieves and displays the record. If no, step 1816 displays the legend "data not found" on monitor 16, after which the program returns to step 1802. If the answer in step 1812 is no, or following step 1815, the program also returns to step 1802.

If the answer is step 1808 is no, step 1818 asks whether "goto" was selected, and if yes, the appropriate menu is displayed in step 1820 and the input selection from keyboard 14 is read. If "record" was selected as indicated by a yes answer in step 1822, the record number is entered in step 1824, whereupon step 1826 asks whether a record number was entered. If no, the program returns to step 1802. If yes, step 1828 then asks whether the total number of records is equal to or less than the entered record number. If no, step 1830 retrieves the record and step 1831 displays the identified record. If yes, step 1832 goes to the last record, and step 1833 displays this record. The program then returns to step 1802.

If the answer in step 1822 is no, step 1834 asks whether "group" was selected. If no, the program returns to step 1802. If yes, the group selection menu is displayed on monitor 16 in step 1836, and the group selection is made is step 1838. Step 1839 then displays the designated group and the program returns to step 1802.

If the answer in step 1818 is no, step 1840 (FIG. 18B) asks whether "index" was selected. If yes, step 1842 creates all necessary indices, and the program returns to step 1802.

If the answer in step 1840 is no, step 1844 asks whether "query" was selected. This selection is used to formulate and search on the basis of a query formula using words and phrases in conventional connector format. If the answer in step 1844 is yes, the query menu is displayed and the selection is read from keyboard 14. The available selections include "quick display", "standard display" or "clear all queries." Step 1846 then asks whether "quick" or "standard" was selected and if yes, the query formula is entered in step 1850. Step 1852 then asks whether an acceptable query was entered and if no, the program returns to step 1802. If yes, step 1854 performs the query. Step 1856 then asks whether the query resulted in any records being found. If yes, step 1858 activates the query index, step 1859 displays the appropriate records on monitor 16 and then returns to step 1802. If the answer in step 1856 is no, step 1860 displays the legend "no records found" on monitor 16, and then returns to step 1802.

If the answer in step 1846 is no, step 1862 asks whether "clear all queries" was entered, and if yes, step 1864 erases all activated query indices and then returns to step 1802. If the answer is step 1862 is no, step 1866 asks whether the exit command has been entered. If no, the program loops back to step 1846, yes, the program returns to step 1802.

If the answer in step 1844 is no, step 1868 asks whether "select" was entered. If no, the program returns to step 1802. yes, step 1870 displays the select menu and reads the entry from keyboard 14. Step 1872 then asks whether "level" was selected. If yes, step 1874 displays the set of levels and the selection entered. From the discussion above, it will be noted that a "level" corresponds to a hierarchical >>> of the Basic Outline headings (or subheadings), contained in the Typology Database. Step 1876 then selects the desired level and step 1877 displays all of records down to the selected level on monitor 16, whereupon the program returns to step 1802.

If the answer in step 1872 is no, step 1878 asks whether "group" was selected. If no, the program returns to step 1802, yes, step 1880 displays the group menu and the desired group entered. Step 1882 then selects the desired group of records and step 1883 displays this group on monitor 16. The program then returns to step 1802.

As those skilled in the art will appreciate, the present invention encompasses many variations in the preferred embodiment described herein. For example, various topics and topic or designation numbers could be used instead of the preferred Typology Numbers. Additionally, the subjects could refer to subject matters in addition to the preferred individuals.

Having thus described the preferred embodiment of the present invention, the following is claimed as new and desired to be secured by Letters Patent.

What is claimed is:

1. A method of operating a computer system having memory for storing and retrieving information concerning a subject, said method comprising steps of:
   (a) in the computer system memory, storing subject data concerning a plurality of subjects wherein said data includes descriptor phrases regarding various matters with which said subjects are concerned and wherein said data includes identifying information for identifying the subjects associated with said descriptor phrases;
   (b) assigning selected designation numbers to said descriptor phrases and storing said selected designation numbers in the computer system memory in association with the corresponding descriptor phrases and with the identifying information wherein said designation numbers correspond to a respective plurality of topics;

(c) in the computer system memory, storing a plurality of topic headings with each heading being designated to include a specified range of designation numbers;

(d) in the computer system, for each designation number assigned to a descriptor phrase, determining which of said topic heading ranges includes said designation number and storing that designation number and corresponding descriptor phrase in association with the associated topic heading;

(e) searching the computer system memory for one of a descriptor phrase descriptive of a selected matter of interest, a range of designation numbers, and a designation number, and if a descriptor phrase is identified, determining the designation number thereof; and (f) using one of said range and designation number determined in step (e) to retrieve from the computer system memory the corresponding identifying information concerning the associated subject.

2. The method as set forth in claim 1 further including the steps of storing said subject data in a subject database, storing said topic headings, designation numbers and corresponding descriptor phrases in a composite catalog database separate from said subject database, storing said descriptor phrases and assigned designation numbers with said identifying information in a topics database, step (e) including the step of searching said composite catalog database, and step (f) including the steps of searching said topics database for said identifying information and of searching said subject database using said identifying information.

3. The method as set forth in claim 1, step (a) further including the step of storing said subject data wherein said subjects are individuals.

4. The method as set forth in claim 3, storing an identification number of the individuals as said identifying information.

5. The method as set forth in claim 4, storing the social security number of the individuals as said identifying information.

6. The method as set forth in claim 3, further including the step of storing said descriptor phrases regarding matters of interest to the individuals as said various matters.

7. The method as set forth in claim 3, further including the steps of storing said subject data to include levels of skill and levels of interest regarding said various matters, step further including the step of using one of said levels of skill and, interest to determine said identifying information.

8. The method as set forth in claim 1, step (b) further including the step of assigning and storing typology numbers as said designation numbers.

9. The method as set forth in claim 8, further including the step of storing a set of typology numbers in association with said descriptor phrases in a topics database.

10. The method as set forth in claim 1, step (c) including the step of creating a basic outline database consisting of a set of descriptor phrases, typology numbers, and end-of-range numbers, such that the set of descriptor phrases, typology numbers, and end-of-range numbers creates a hierarchical classification scheme.

11. The method as set forth in claim 1, step (e) further including the step of determining the range of designation numbers inclusive of said designation number, step (f) further including the step of using said range of designation numbers to retrieve identifying information concerning a plurality of associated subjects.

12. The method as set forth in claim 1, step (d) further including the step of determining the last designation number stored in association with each topic heading, designating and storing said last number as the end of range number of said topic heading.

13. The method as set forth in claim 12, further including the steps of configuring said topic headings as a hierarchical classification scheme, using respective typology numbers as said designation numbers and designating the last typology number in the range associated with each of said topic headings as an end-of-range number, and using the typology number assigned to a particular descriptor phrase and the end-of-range number of the associated topic heading as numerical range associated with said particular descriptor phrase, such that said numerical range represents a particular segment of the hierarchical classification scheme at a particular hierarchical level therewithin.

14. The method as set forth in claim 13, further including the steps of configuring the typology number and end-of-range number associated with each descriptor phrase as a record within the hierarchical classification scheme so that the group of said records constitutes the classification scheme for the system, and storing said records in a basic outline database.

15. A method of operating a computer system having memory for identifying individuals having particular interests concerning various matters, said method comprising steps of:

(a) in the computer system memory, storing, in a subject database, subject data concerning a plurality of individuals wherein said data includes descriptor phrases regarding various matters of interest to the individuals and wherein said data includes identifying information for identifying the individuals associated with said descriptor phrases;

(b) assigning selected typology numbers to said descriptor phrases and storing said selected typology numbers in the computer system memory in association with the corresponding descriptor phrases and with the identifying information wherein said typology numbers correspond to a respective plurality of topics;

(c) in the computer system memory, storing in a composite catalog database separate from said subject database, a plurality of topic headings with each heading being designated to include a specified range of typology numbers;

(d) in the computer system, for each typology number assigned to a descriptor phrase, determining which of said topic heading ranges includes said typology number and storing that typology number and corresponding descriptor phrase in association with the associated topic heading;

(e) searching said catalog database for one of a descriptor phrase descriptive of a selected matter of interest and a typology number, and if a descriptor phrase is searched, determining the typology number thereof; and (f) using said typology number determined in step (e) for searching and retrieving from said subject database the corresponding identifying information concerning the associated individual.

* * * * *